US007903691B2

(12) United States Patent
Hwang et al.

(10) Patent No.: US 7,903,691 B2
(45) Date of Patent: Mar. 8, 2011

(54) METHOD OF GENERATING PILOT PATTERN FOR ADAPTIVE CHANNEL ESTIMATION IN OFDMA SYSTEMS, METHOD OF TRANSMITTING/RECEIVING USING THE PILOT PATTERN AND APPARATUS THEREOF

(75) Inventors: Sung-Hyun Hwang, Daejeon (KR);
Chang-Joo Kim, Daejeon (KR);
Myung-Sun Song, Daejeon (KR);
Jung-Sun Um, Suwon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 208 days.

(21) Appl. No.: 12/298,225

(22) PCT Filed: Apr. 24, 2007

(86) PCT No.: PCT/KR2007/002004
§ 371 (c)(1),
(2), (4) Date: Oct. 23, 2008

(87) PCT Pub. No.: WO2007/123364
PCT Pub. Date: Nov. 1, 2007

(65) Prior Publication Data
US 2009/0274174 A1 Nov. 5, 2009

Related U.S. Application Data

(60) Provisional application No. 60/794,382, filed on Apr. 24, 2006, provisional application No. 60/845,571, filed on Sep. 19, 2006.

(30) Foreign Application Priority Data

Apr. 24, 2007 (KR) .................... 10-2007-0040013

(51) Int. Cl.
*H04B 3/10* (2006.01)
(52) U.S. Cl. .......... 370/491; 370/203; 370/310; 370/314; 370/330; 370/480; 370/500

(58) Field of Classification Search .................. 370/203, 370/310, 314, 330, 480, 491, 500
See application file for complete search history.

(56) References Cited

U.S. PATENT DOCUMENTS

| 2005/0002369 | A1* | 1/2005 | Ro et al. .................. 370/342 |
| 2005/0147024 | A1* | 7/2005 | Jung et al. ................. 370/203 |
| 2005/0201476 | A1* | 9/2005 | Kim et al. ................. 375/260 |
| 2006/0146867 | A1* | 7/2006 | Lee et al. .................. 370/465 |
| 2007/0121538 | A1* | 5/2007 | Ode et al. ................. 370/323 |
| 2009/0257519 | A1* | 10/2009 | Lin et al. ................. 375/260 |

FOREIGN PATENT DOCUMENTS

| EP | 1 643 669 A1 | 4/2006 |
| KR | 2005-0039263 A | 4/2005 |
| KR | 2005-0051865 A | 6/2005 |
| KR | 2006-0082228 A | 7/2006 |

OTHER PUBLICATIONS

International Search Report-mailed Jul. 25, 2007; PCT/KR2007/002004.

* cited by examiner

*Primary Examiner* — Kwang B Yao
*Assistant Examiner* — Nguyen Ngo
(74) *Attorney, Agent, or Firm* — Ladas & Parry LLP

(57) ABSTRACT

Provided is a method of generating a pilot pattern capable of perform adaptive channel estimation, and a method and apparatus of a base station and a method and apparatus of a terminal using the pilot pattern. The pilot pattern selects pilot symbol positions based on distances from pilots of previous orthogonal frequency division multiple access (OFDMA) symbols to a subcarrier position of a current OFDMA symbol in the frequency domain and the time domain, so that a low pilot density is maintained so as to effectively transmit data, and stable channel estimation performance can be obtained even in a bad channel environment. In addition, the minimum burst allocation size is determined according to the channel environment between the base station and the terminal, guaranteeing channel estimation performance suitable for the channel environment, and improving granularity, channel estimation latency, and channel estimation memory size.

18 Claims, 18 Drawing Sheets

PILOT PATTERN IN IEEE 802.16e DOWNLINK PUSC MODE

PILOT PATTERN IN ETSI DVB-T(H) MODE

SLOT SIZE IS 2 (FREQUENCY AND TIME PILOT INTERVALS ARE 2)

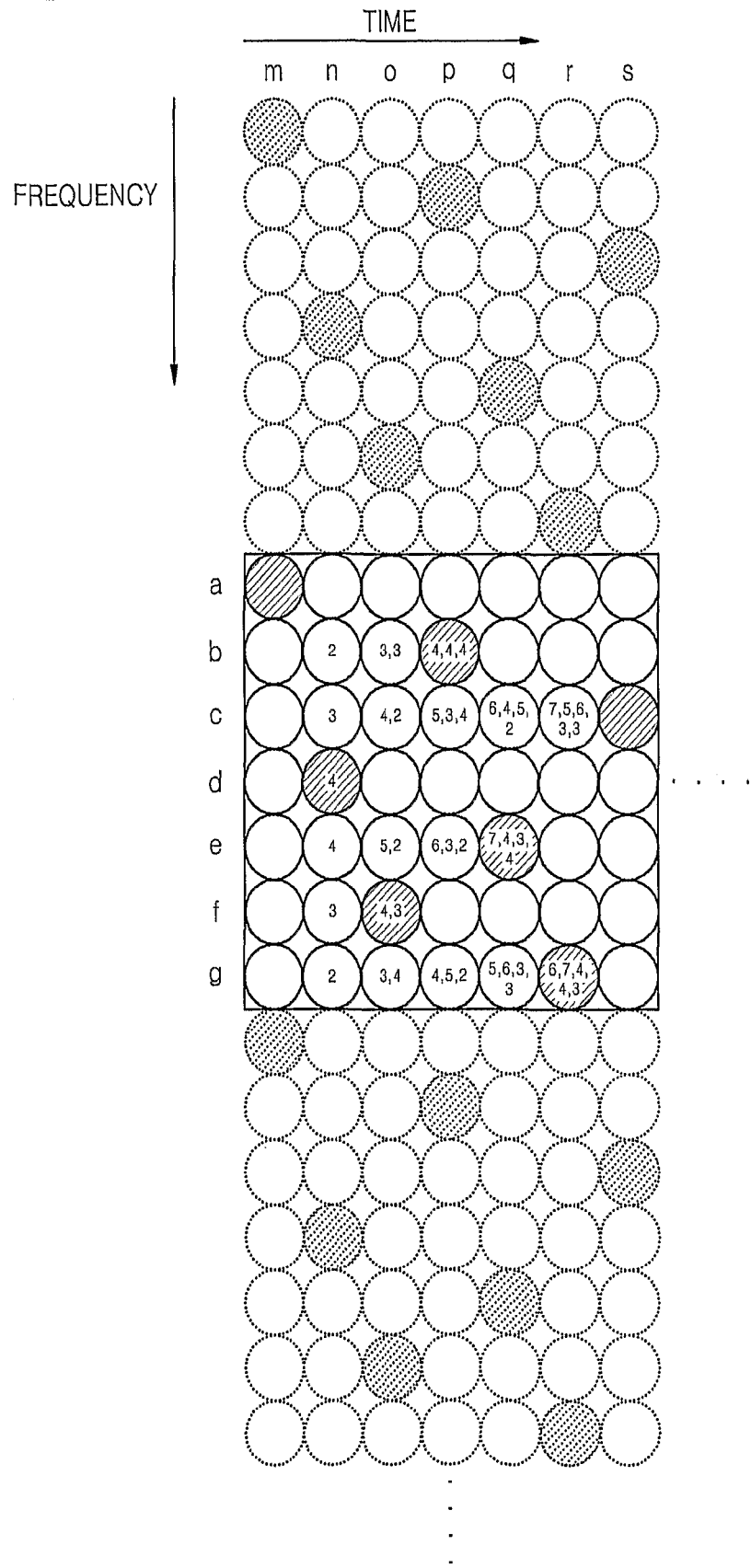
FIG. 5B  SLOT SIZE IS 7 (FREQUENCY AND TIME PILOT INTERVALS ARE 7)

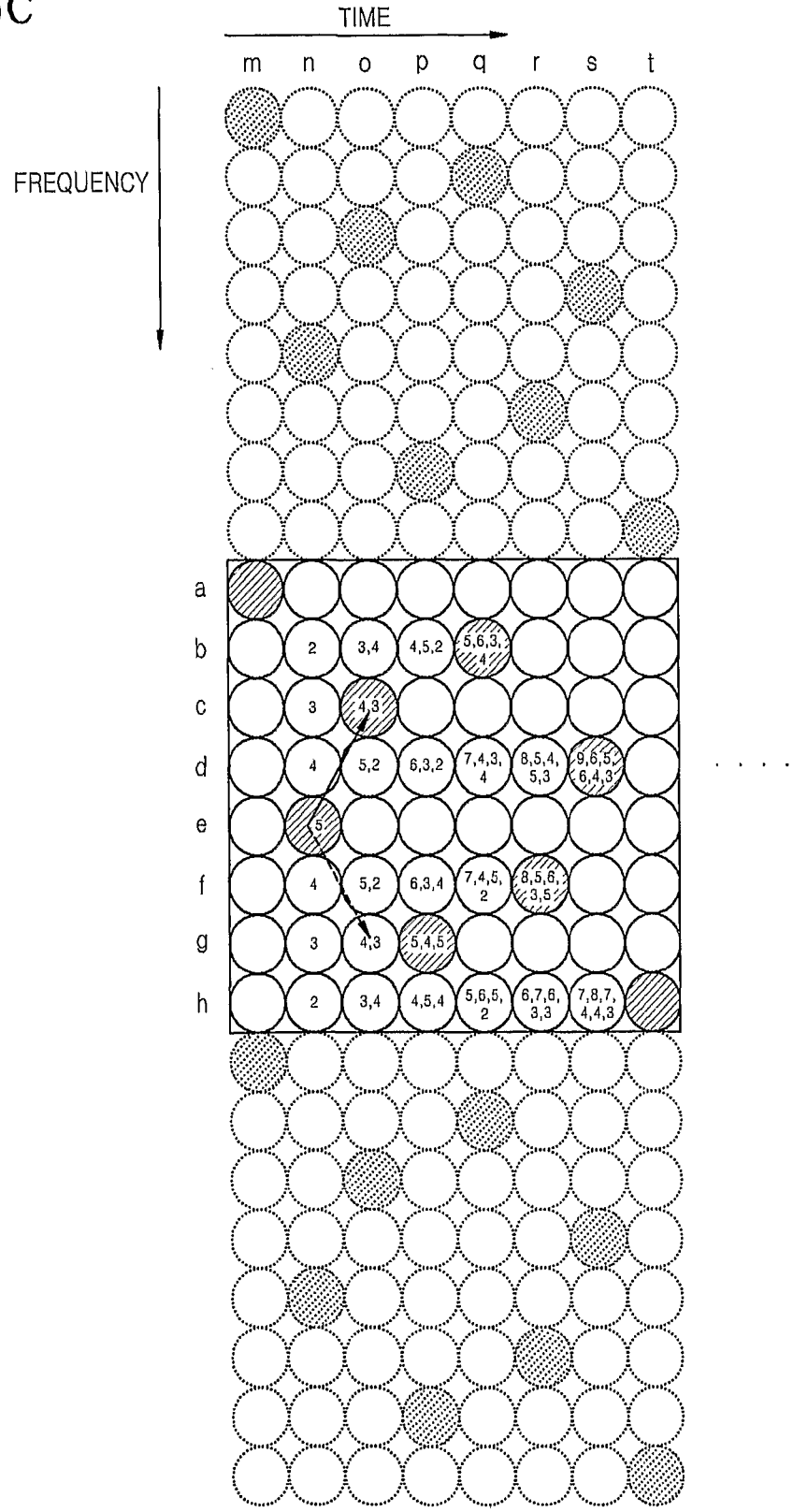
FIG. 5C  SLOT SIZE IS 8 (FREQUENCY AND TIME PILOT INTERVALS ARE 8)

METHOD OF GENERATING PILOT PATTERN FOR ADAPTIVE CHANNEL ESTIMATION IN OFDMA SYSTEMS, METHOD OF TRANSMITTING/RECEIVING USING THE PILOT PATTERN AND APPARATUS THEREOF

TECHNICAL FIELD

The present invention relates to a pilot pattern in a wireless communication system, and more particularly, to a method of generating a pilot pattern capable of minimizing channel estimation performance degradation due to interpolation in a bad channel environment while maintaining a low pilot density, and a transmitting and receiving method capable of adaptively controlling channel estimation performance, granularity, channel estimation latency, channel estimation memory size, and the like, to be suitable for a channel environment between a base station and a terminal, by using the generated pilot pattern.

BACKGROUND ART

In a wireless communication system, a received signal is influenced by a channel environment, and thus it is necessary to compensate for the influence of the channel environment. To do this, a predetermined pilot symbol is inserted in the time domain and the frequency domain during data transmission between a transmitter and a receiver in the wireless communication system. The receiver performs channel estimation using two continuous pilot symbols, to compensate for channel deterioration of data symbols between the two pilot symbols.

As a result, when the interval between the pilot symbols decreases, and the density of the pilot symbols increases, the channel estimation performance is improved. However, the ratio of the pilot symbols in a frame increases, which reduces information transmission efficiency.

FIGS. 1 and 2 show examples of a pilot pattern used in an existing orthogonal frequency-division multiplexing (OFDM) system.

FIG. 1 shows a pilot pattern used in a downlink partial usage of sub-channels (PUSC) mode in IEEE 802.16e worldwide interoperability for microwave access (WiMAX) standard, and FIG. 2 shows a pilot pattern used in a European telecommunications standards institute (ETSI) digital video broadcasting terrestrial (handheld) (DVB-T(H)) mode.

Referring to FIG. 1, in the pilot pattern, pilots are inserted into subcarriers, which is repeated every 2 orthogonal frequency division multiple access (OFDMA) symbols. In this structure, although sufficient OFDMA symbols are collected by the receiver to be used for channel estimation, a pilot interval is always fixed as 4 in a slot, so that in order to compensate for the channel deterioration of a data subcarrier between the pilots, interpolation has to be performed, and correspondingly performance degradation due to the interpolation cannot be avoided.

Referring to FIG. 2, in the pilot pattern, pilots are inserted into subcarriers, which is repeated every 4 OFDM symbols. In this structure, although 4 OFDM symbols are collected to be used for channel estimation, the pilot interval is always fixed as 3, so that the channel estimation performance degradation due to the interpolation cannot be avoided either.

In addition, the existing pilot pattern has a structure in which adaptive control of the channel estimation performance, granularity, channel estimation latency, and the channel estimation memory size according to the channel environment is impossible.

Therefore, a pilot pattern capable of minimizing the channel estimation performance degradation due to the interpolation while maintaining a low pilot density, and an adaptive channel estimation method using the pilot pattern are required.

DETAILED DESCRIPTION OF THE INVENTION

Technical Problem

The present invention provides a method of generating a pilot pattern capable of minimizing channel estimation performance degradation due to interpolation in a bad channel environment while maintaining a low pilot density.

The present invention also provides a method of adaptively controlling a channel estimation performance, granularity, channel estimation latency, channel estimation memory size, and the like to be suitable for a channel environment between a base station and a terminal by using the generated pilot pattern.

The objects and advantages of the present invention will be explained in the following description, which includes exemplary embodiments of the present invention. In addition, it can be easily understood that the objects and advantages of the present invention can be implemented with means disclosed in the appended claims and combinations thereof.

Technical Solution

According to an aspect of the present invention, there is provided a method of generating a pilot pattern, comprising: (a) determining a size of a slot which is a section in which a pilot pattern is repeated in the time domain and the frequency domain; (b) determining an arbitrary subcarrier in a first OFDMA (orthogonal frequency division multiple access) symbol within the slot in the time domain as a pilot inserting position; (c) calculating frequency-time distances of each of remaining subcarriers of a current OFDMA symbol after the first OFDMA symbol excluding subcarriers into which pilots in all the previous OFDMA symbols within the slot in the time domain are inserted, from the pilots of all of the previous OFDMA symbols within the slot in the time domain to each of the remaining subcarriers; (d) comparing minimum distances of the frequency-time distance sets of the remaining subcarriers; and (e) determining a subcarrier having the largest frequency-time minimum distance to be the pilot inserting position.

The method may further include, (f) when the number of the subcarriers having the same largest value is two or more after comparing the last minimum distances in the frequency-time distance sets, calculating frequency distances of each of the subcarriers having the same largest value, from the pilots of all of the previous OFDMA symbols within the slot in the time domain to each of the subcarriers having the same largest value, in the frequency direction; (g) comparing minimum distances in the frequency distance sets; and (h) determining the subcarrier having the largest frequency minimum distance to be the pilot inserting position.

The method may further include, (i) when the number of subcarriers having the same largest value is two or more after comparing the last minimum distances in the frequency distance sets, determining an arbitrary one of the subcarriers having the same largest value of the last minimum distances in the frequency distance sets to be the pilot inserting position.

According to an aspect of the present invention, there is provided a transmitting and receiving method for a base station, (a) determining a minimum burst allocation size of a terminal according to the predetermined criterion; (b) generating a pilot pattern in which pilot intervals for channel estimation can be changed according to the minimum burst allocation size; and (c) generating a transmission signal based on the pilot pattern.

The method may further include, (d) estimating a channel after channel estimation latency based on information on the determined uplink burst region for a signal received from the terminal.

According to another aspect of the present invention, there is provided a transmitting and receiving method for a terminal, comprising: (a) receiving a signal transmitted according to a pilot pattern in which pilot intervals for channel estimation can be changed, from a base station; (b) detecting an up/downlink burst region from the received signal; and (c) estimating a channel for the received signal after channel estimation latency based on information on the detected downlink burst region.

The method may further include, (d) generating a pilot pattern in which pilot intervals for channel estimation can be changed; and (e) generating a transmission signal according to the pilot pattern in the uplink burst region determined based on the information on the detected uplink burst region.

According to another aspect of the present invention, there is provided an apparatus for generating a pilot pattern, comprising: a slot determiner determining the size of a slot which is a section in which a pilot pattern is repeated in the time domain and the frequency domain; a distance calculator calculating frequency-time distances of each of remaining subcarriers of a current OFDMA symbol after the first OFDMA symbol excluding subcarriers into which pilots of previous OFDMA symbols within the slot in the time domain are inserted, from the pilots of the previous OFDMA symbols within the slot in the time domain to each of the remaining subcarriers; a distance comparator comparing the minimum distances of the frequency-time distance sets of the remaining subcarriers; and a position determiner determining a subcarrier having a maximum frequency-time minimum distance to be the pilot inserting position, and determining an arbitrary subcarrier in the first OFDMA symbol within the slot in the time domain as the pilot inserting position.

The distance calculator may calculate frequency distances of each of the subcarriers having the same largest value, from the pilots of all of the previous OFDMA symbols within the slot in the time domain to each of the subcarriers having the same largest value, in the frequency direction, when the number of subcarriers having the same largest value is two or more after comparing the last minimum distances in the frequency-time distance sets, the distance comparator may compare the minimum distances in the frequency distance sets, and the position determiner may determine the subcarrier having the largest frequency minimum distance to be the pilot inserting position.

The position determiner may determine one of the subcarriers having the same largest value of the last minimum distances in the frequency distance sets to be the pilot inserting position, when the number of subcarriers having the same largest value is two or more after comparing the last minimum distances in the frequency distance sets.

According to another aspect of the present invention, there is provided a transmitting and receiving apparatus of a base station, comprising: a burst determiner determining a minimum burst allocation size of a terminal according to the predetermined criterion; a pilot pattern generator generating a pilot pattern in which pilot intervals for channel estimation can be changed according to the minimum burst allocation size; and a transmission signal generator generating a transmission signal based on the pilot pattern.

The apparatus may further comprise a received signal processor estimating a channel after channel estimation latency based on information on the determined uplink burst region for a signal received from the terminal.

According to another aspect of the present invention, there is provided a transmitting and receiving apparatus of a terminal, comprising: a signal receiver receiving a signal transmitted according to a pilot pattern in which pilot intervals for channel estimation can be changed, from a base station; a burst region detector detecting an up/downlink burst region from the received signal; a received signal processor estimating a channel for the received signal after channel estimation latency based on information on the detected downlink burst region.

The apparatus may further comprise a pilot pattern generator generating a pilot pattern in which pilot intervals for channel estimation can be changed; and a transmission signal generator generating a transmission signal according to the pilot pattern in the uplink burst region determined based on the information on the detected uplink burst region.

According to another aspect of the present invention, there is provided a computer readable recording medium having embodied thereon a computer program for executing a method of generating a pilot pattern, a transmitting and receiving method for a base station, and a transmitting and receiving method for a terminal.

ADVANTAGEOUS EFFECTS

The pilot pattern selects pilot symbol positions based on distances from pilots of previous orthogonal frequency division multiple access (OFDMA) symbols to a subcarrier position of a current OFDMA symbol in the frequency domain and the time domain, so that in the last OFDMA symbol in a slot, channel information at all pilot subcarrier positions is copied and used for channel estimation. Therefore, a low pilot density can be maintained, allowing data to be transmitted effectively, preventing performance degradation due to interpolation in a bad environment, and obtaining stable channel estimation performance.

In addition, channel estimation is performed by using the pilot pattern. Therefore, the minimum burst allocation size is determined according to the channel environment between the base station and the terminal, guaranteeing channel estimation performance suitable for the channel environment, and adaptively improving granularity, channel estimation latency, and channel estimation memory size.

DESCRIPTION OF THE DRAWINGS

FIGS. 5A to 5D show examples of a pilot pattern for various slot lengths generated by applying the method in FIG. 3.

BEST MODE

Mode of the Invention

Figure 1:
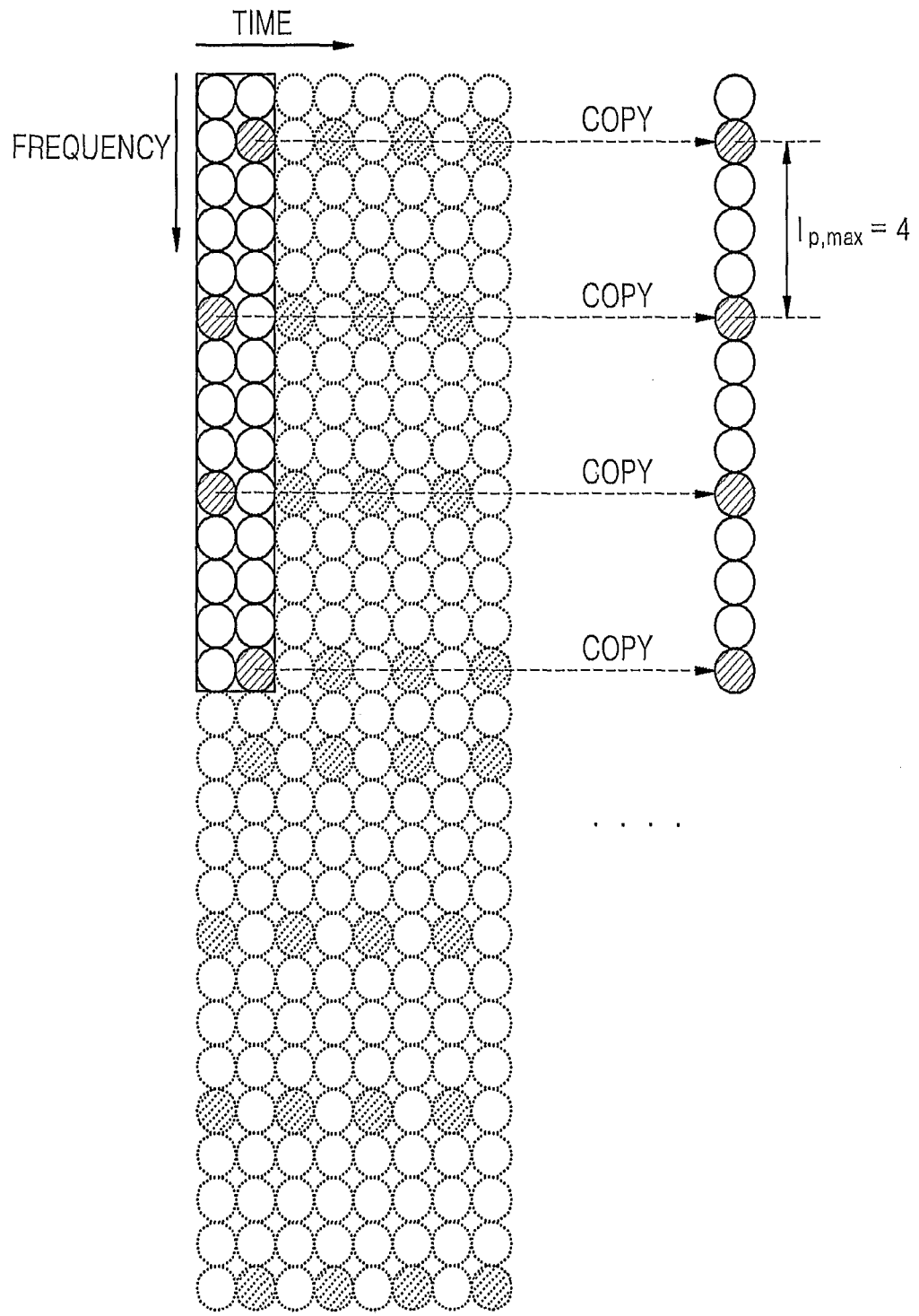
FIG. 1 shows a pilot pattern used in a downlink partial usage of sub-channels (PUSC) mode in IEEE 802.16e worldwide interoperability for microwave access (WiMAX) standard.

Exemplary embodiments of the present invention will now be described in detail with reference to the attached drawings. Like reference numerals denote like elements in the drawings. In the description, the detailed description of widely known functions and structures may be omitted so as not to obscure the essence of the present invention.

In addition, when a part "comprises" a component, it means that the part may further comprise other components, and does not exclude any components unless otherwise described.

Figure 3:
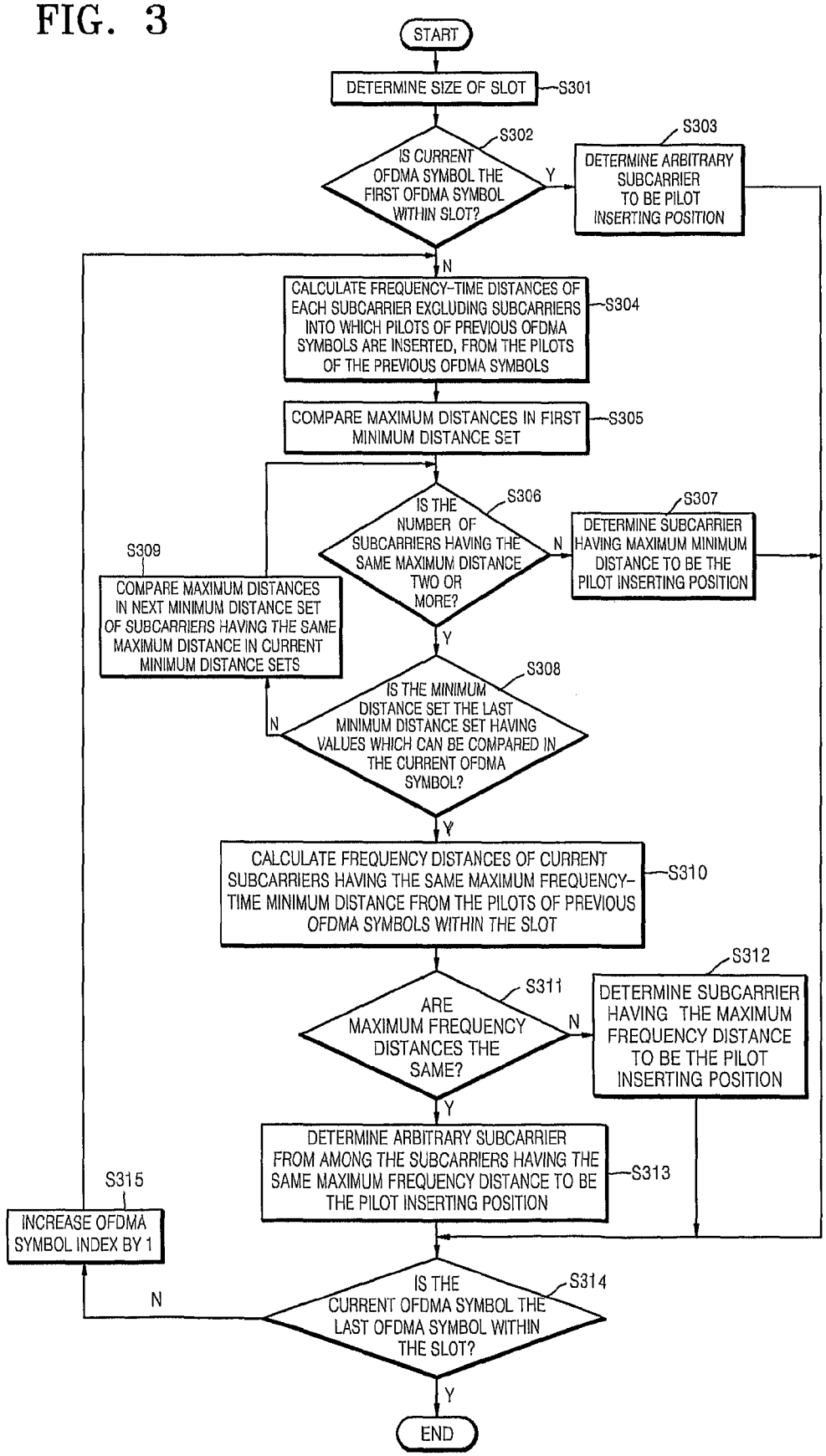
FIG. 3 is a flowchart for explaining a method of generating a pilot pattern in a transmitter of an orthogonal frequency division multiple access (OFDMA) system according to an embodiment of the present invention.

FIG. 3(FIG. 3A and FIG. 3B) is a flowchart for explaining a method of generating a pilot pattern in a transmitter of an orthogonal frequency division multiple access (OFDMA) system according to an embodiment of the present invention.

The pilot pattern is a pattern for arranging pilot symbols in the frequency domain and the time domain.

In an OFDM/OFDMA communication system, a burst is allocated to a data frame according to a user, and according to the burst allocation size, the number of OFDMA symbols used for channel estimation is determined. In the pilot pattern according to the current embodiment, a pilot interval in an OFDMA symbol used for channel estimation can be changed according to a minimum burst allocation size, so that by changing the minimum burst allocation size according to a channel environment, granularity, channel estimation latency, and channel estimation memory size can be optimized, and stable channel estimation performance can be obtained.

Referring to FIG. 3, in order to form a pilot pattern, a slot size is determined (operation S301). According to the current embodiment, the slot is a section in which a pilot pattern is repeated in the time domain and the frequency domain, and is defined by a frequency pilot interval in which a pilot pattern is repeated in the frequency domain and a time pilot interval in which a pilot pattern are repeated in the time domain. The size of the slot is represented as the number of subcarriers in the frequency domain and the number of OFDMA symbols in the time domain within the slot, and can be selected according to the channel characteristics of a target system.

It is determined that a current OFDMA symbol in which a pilot inserting position is determined is a first OFDMA symbol of the slot (operation 3302).

When the current OFDMA symbol is the first OFDMA symbol of the slot, an arbitrary subcarrier in the OFDMA symbol is determined to be the pilot inserting position (operation S303). A pilot position in each of the OFDMA symbols including the first OFDMA symbol is used as a reference for determining a pilot position of the next OFDMA symbol.

For each OFDMA symbol from the second OFDMA symbol of the slot, the distances from all the previous pilots to each of the current remaining subcarriers, excluding subcarrier rows into which the pilots in the previous OFDMA symbols of the slot are inserted, in frequency direction and time direction, are calculated. Thus, frequency-time distances are obtained (operation S304). Though a diagonal distance can also be used, the frequency-time distance, however, means the sum of each distance in the frequency direction and the time direction. A weight factor is applied to calculate each distance in the frequency direction and the time direction, and may be different according to the system and the environment. The frequency-time distance is calculated using the one of the two continuous pilots, of the previous OFDMA symbol, which is closer to the current subcarrier.

The distance values in frequency-time distance sets calculated for remaining subcarriers are sequentially compared with each other, and the subcarrier having the largest value is determined to be the pilot inserting position (operations S305 to S309).

For example, when four remaining subcarriers exist in the fourth OFDMA symbol, each of the four remaining subcarriers has three frequency-time distance values because frequency-time distances are calculated from each pilot of three previous (first, second, and third) OFDMA symbols. A set of the three frequency-time distance values is referred to as the frequency-time distance set, and four values which are the respective smallest values in the frequency-time distance sets of the four subcarriers are referred to as a first minimum distance set. Next, four values which are the respective second smallest values in the frequency-time distance sets of the four subcarriers become a second minimum distance set, and in this manner, a third minimum distance set is also constructed.

Returning to FIG. 3, values in the first minimum distance set of the frequency-time distance sets are compared with each other (operation S305).

It is determined whether the number of subcarriers having the same largest value (hereinafter, also referred to as maximum distance) in the first minimum distance set is two or more (operation S306).

When the number of subcarriers having the same maximum distance in the first minimum distance set is one, the one subcarrier is determined to be the pilot inserting position (operation S307).

When the number of subcarriers having the maximum distance in the first minimum distance set is two or more, it is determined whether the first minimum distance set is the last minimum distance set to be compared in the current OFDMA symbol (operation S308).

When the first minimum distance set is not the last minimum distance set, for the subcarriers having the same maximum distance in the current minimum distance set, values in the next minimum distance set are compared with each other (operation S309), and the subcarrier having the maximum distance is determined to be the next pilot inserting position (operation S307).

When the number of subcarriers having the same maximum distance is still two or more, even though values in the last minimum distance set have been compared, for each of the two or more subcarriers having the same maximum distance, distances from pilots of previous OFDMA symbols to each of the two or more subcarriers only in the frequency direction (hereinafter, referred to as frequency distances) are calculated (operation S310). Since a change in the frequency direction is faster than a change in the time direction, it is preferable that the distances in the frequency direction are compared in order to select a proper pilot position.

The frequency distances are compared with each other (operation S311), and the subcarrier having the largest frequency distance is determined to be the pilot inserting position (operation S312). When the number of frequency distance values of each subcarrier is one or more, similarly to operations S305 to 309, frequency distance values are sequentially compared with each other from the smallest one, and according to the result of the comparison, the subcarrier having the largest value (hereinafter, also referred to as the maximum frequency distance) is determined to be the pilot inserting position.

For example, in the fourth OFDMA symbol, when the number of remaining subcarriers having the same maximum distance in the last minimum distance set of the frequency-time sets is two, each of the two remaining subcarriers has three frequency distance values because frequency distances are calculated from pilots of three (first, second, and third) previous OFDMA symbols to each of the remaining subcarriers. A set of the three frequency distance values is referred to as a frequency distance set, and two values selected as the respective smallest values in the frequency distance sets of two subcarriers are referred to as a first frequency minimum distance set. Next, two values selected as the respective second smallest values in the frequency distance sets of the two subcarriers are referred to as a second frequency minimum distance set, and similarly, a third frequency minimum distance set is also constructed.

Returning to FIG. 3, when the number of subcarriers having the same largest value is two or more, even though values in the last minimum distance set of the frequency distance sets have been compared, the position of an arbitrary one of the subcarriers having the same largest value is determined to be the pilot inserting position (operation S313).

It is determined whether the current OFDMA symbol is the last OFDMA symbol in the slot (operation S314).

When the current OFDMA is not the last OFDMA symbol, in order to determine the pilot inserting position for the next OFDMA symbol by performing operations 304 to 313, an OFDMA symbol index is increased by 1 (operation S315). Operations 304 to 313 are repeated till the last OFDMA symbol within the slot.

A pilot inserted into each OFDMA symbol of the slot which has the same size in the frequency domain and the time domain, that is, the slot having equal frequency pilot interval and time pilot interval, in the frequency domain, is repeatedly positioned every interval which is the same as the time pilot interval.

FIGS. 4A to 4E are diagrams for explaining a pilot inserting order used to generate the pilot pattern according to the embodiment shown in FIG. 3.

For convenience of description, the case where a slot including five subcarriers, that is, first (a-th) to fifth (e-th) subcarriers in the frequency domain, and five OFDMA symbols, that is, first (m-th) to fifth (q-th) OFDMA symbols in the time domain, has a slot size of 5 is used as an example. It will be understood by those skilled in the art that the method can be applied to a case where the slot size in the frequency domain is different from that in the time domain, or the slot size is smaller or larger than 5.

Figure 4A:
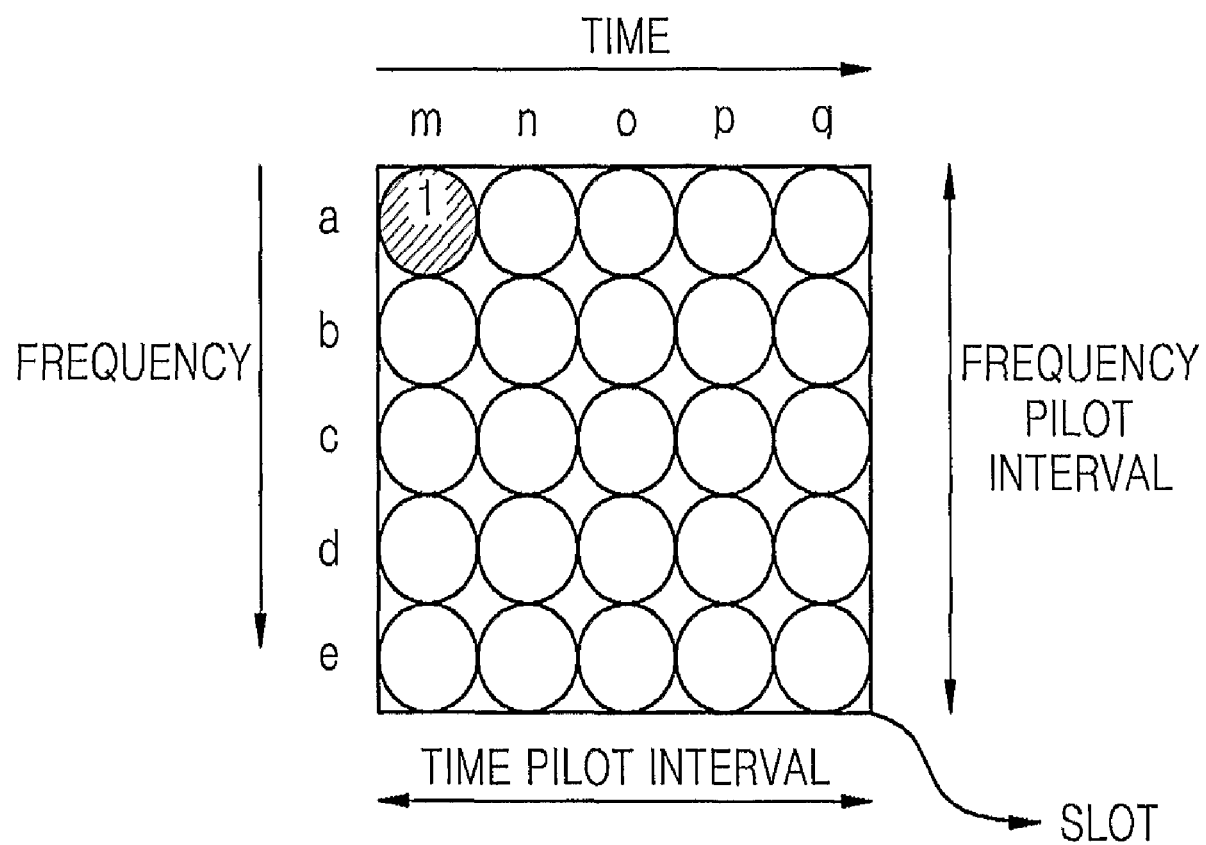
FIGS. 4A to 4E are diagrams for explaining a pilot inserting order used to generate the pilot pattern according to the embodiment shown in FIG. 3.

Referring to FIG. 4A, a first pilot is inserted into an a-th subcarrier, which is an arbitrary subcarrier in the m-th OFDMA symbol that is the first OFDMA symbol of the slot. The pilot is repeatedly inserted into the m-th OFDMA symbol at an interval of 5.

Figure 4B:
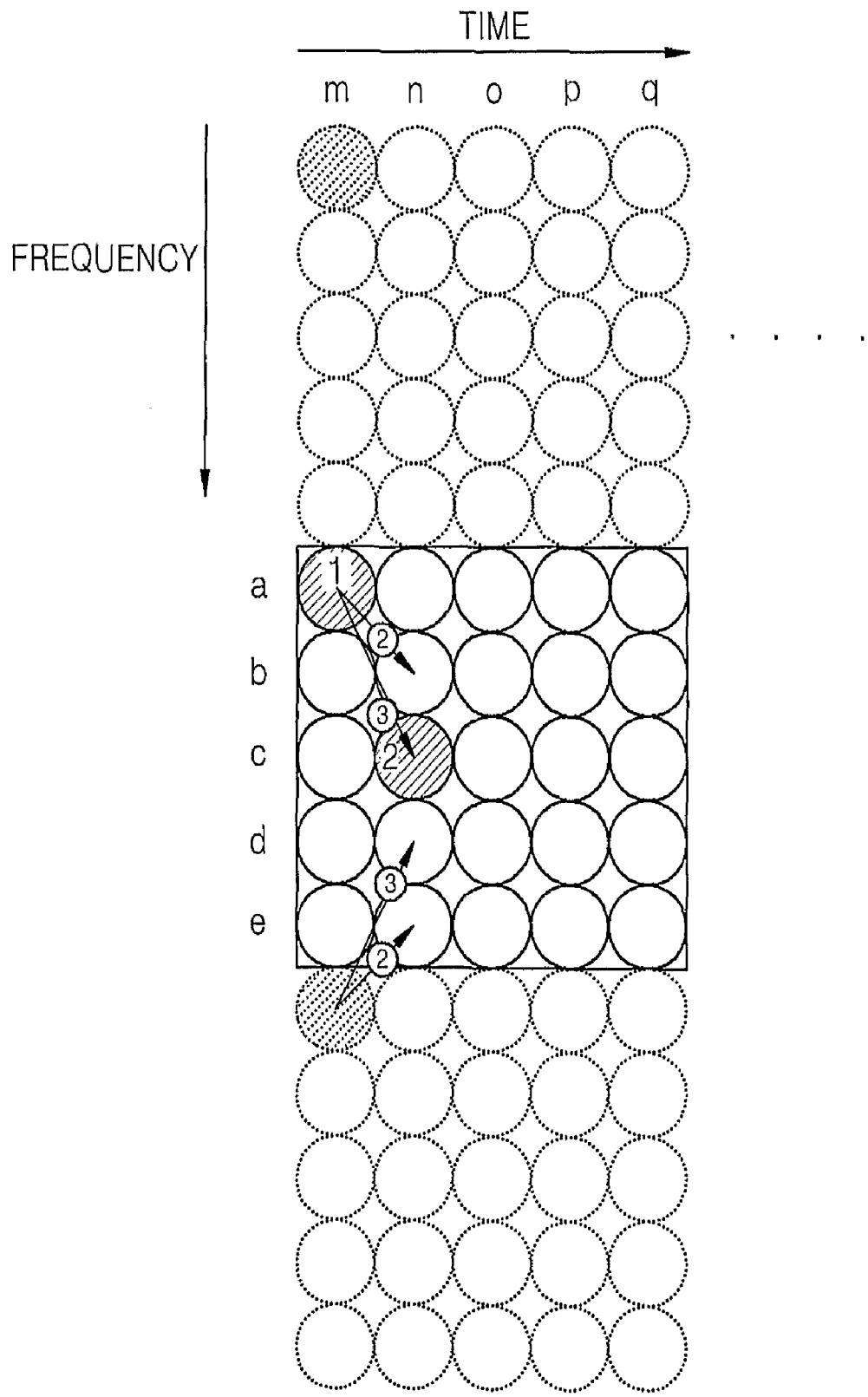

Referring to FIG. 4B, in an n-th OFDMA symbol, which is the second OFDMA symbol, b, c, d, and e-th subcarriers, but not the a-th subcarrier row into which the pilot of the m-th OFDMA symbol is inserted, become candidate positions into which a second pilot is to be inserted.

The frequency-time distance from the a-th subcarrier in the m-th OFDMA symbol that is the previous pilot position to the b-th subcarrier in the n-th OFDMA symbol is 2, calculated by adding a distance of 1 in the frequency domain to a distance of 1 in the time domain. In this manner, frequency-time distances from the a-th subcarrier in the m-th OFDMA symbol that is the previous pilot position to the c, d, and e-th subcarriers are respectively 3, 3, and 2. The frequency-time distances to the d- and e-th subcarrier in the n-th OFDMA symbol are calculated using a lower pilot which is closer to the d- and e-th subcarrier than an upper pilot in the m-th OFDMA symbol. In the above example, a weight factor of 1 is applied to calculate each distance in the frequency direction and the time direction. However, as described above, a different weight factor to the direction can be applied according to the system and the environment.

Therefore, frequency-time distance sets calculated at the b, c, d, and e subcarriers in the n-th OFDMA symbol are (2), (3), (3), and (2), and since the number of frequency-time distances of each subcarrier is 1, the minimum distance set is {2, 3, 3, 2}.

The subcarriers having the largest value in the minimum distance set, that is, having the maximum distance, are the c and d-th subcarriers, having the distance of 3. Since the maximum distances of the c and d-th subcarriers are both 3, and there is no further minimum distance set to be compared, distances are calculated only in the frequency domain from the positions of the c and d-th subcarriers to the previous pilot (the a-th subcarrier in the m-th OFDMA symbol, or a subcarrier distant from the a-th subcarrier in the m-th OFDMA symbol by the frequency pilot interval) and are compared with each other.

Here, the frequency distances are both 2, so one of the c and d-th subcarriers is arbitrarily selected as a subcarrier into which the pilot is inserted. In the example of FIG. 4B, the c-th subcarrier in the n-th OFDMA symbol is selected as the pilot position.

Figure 4C:
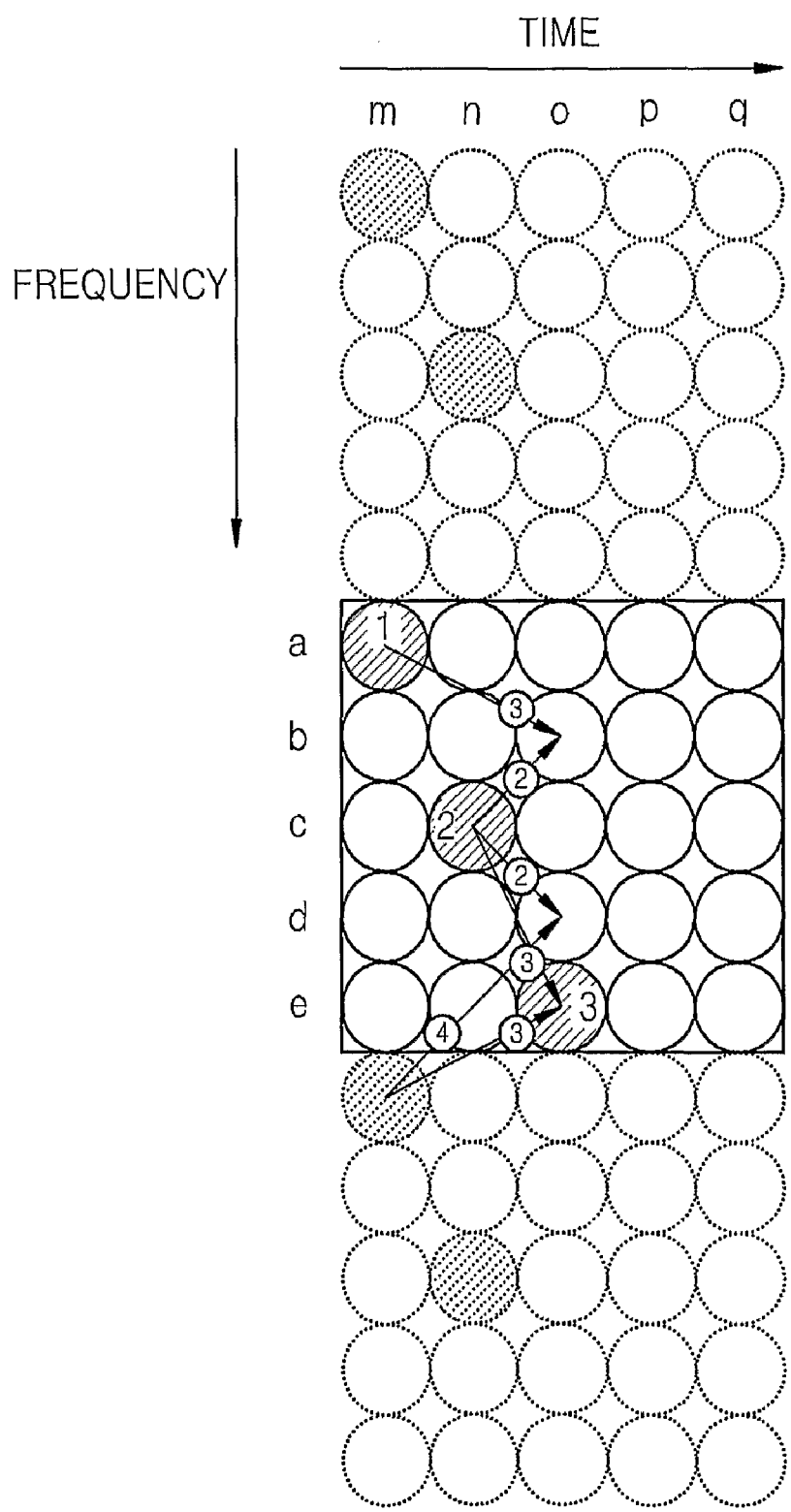

Referring to FIG. 4C, in the o-th OFDMA symbol that is the third OFDMA symbol, the b, d, and e-th subcarriers but not the a and c-th subcarrier rows into which the pilots of the m and n-th OFDMA symbols that are previous symbols are inserted, become candidate positions into which a third pilot is to be inserted.

Frequency-time distances from the pilot position of each of the m and n-th OFDMA symbols to the b, d, and e-th subcarriers in the o-th OFDMA symbol are sequentially calculated as (3,2), (4,2), and (3,3). The first minimum distance set is {2, 2, 3}, wherein 2 is selected as the smallest of the distances (3,2) of the b-th subcarrier, 2 is selected as the smallest of the distances (4,2) of the d-th subcarrier, and 3 is selected as the smallest value of distances (3,3) of the e-th subcarrier. In the first minimum distance set, the maximum distance is 3, of the e-th subcarrier. Accordingly, the pilot inserting position in the o-th OFDMA symbol is the e-th subcarrier.

Figure 4D:
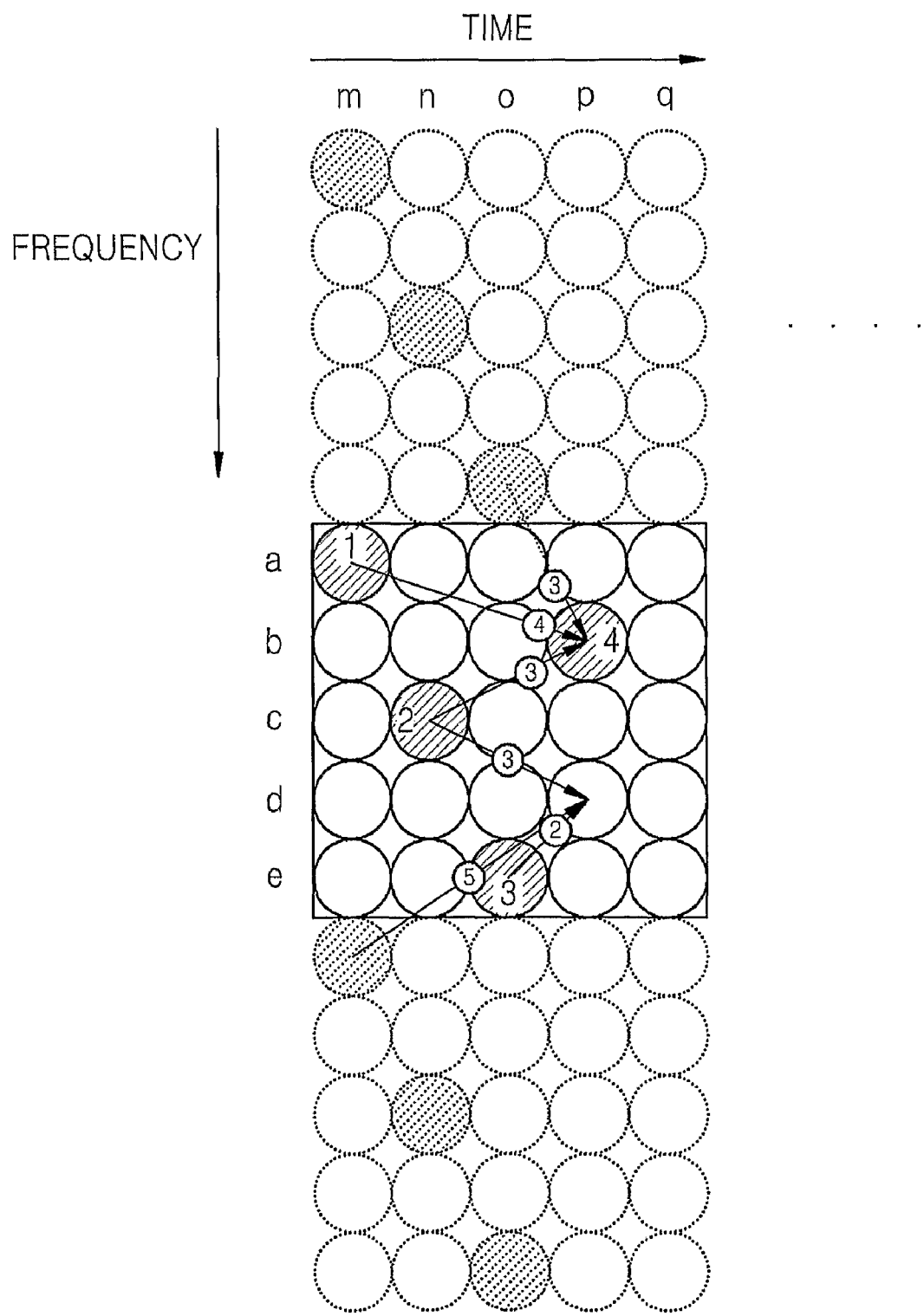

Referring to FIG. 4D, in the p-th OFDMA symbol, that is the fourth OFDMA symbol, the b and d-th subcarriers, but not the a, c, and e-th subcarrier rows into which the pilots of the m, n, and o-th OFDMA symbols that are previous symbols are inserted, become candidate positions into which a fourth pilot is to be inserted.

Frequency-time distances from the pilot position of each of the m, n, and o-th OFDMA symbols to the b and d-th subcarriers in the p-th OFDMA symbol are sequentially calculated as (4,3,3) and (5,3,2). The first minimum distance set is {2,3}, wherein 3 is selected as the smallest of the distances (4,3,3) of the b-th subcarrier, and 2 is selected as the smallest value of distances (5,3,2) of the d-th subcarrier. In the first minimum distance set, the maximum distance is 3, of the b-th subcarrier. Accordingly, the pilot inserting position in the p-th OFDMA symbol is the b-th subcarrier.

Figure 4E:
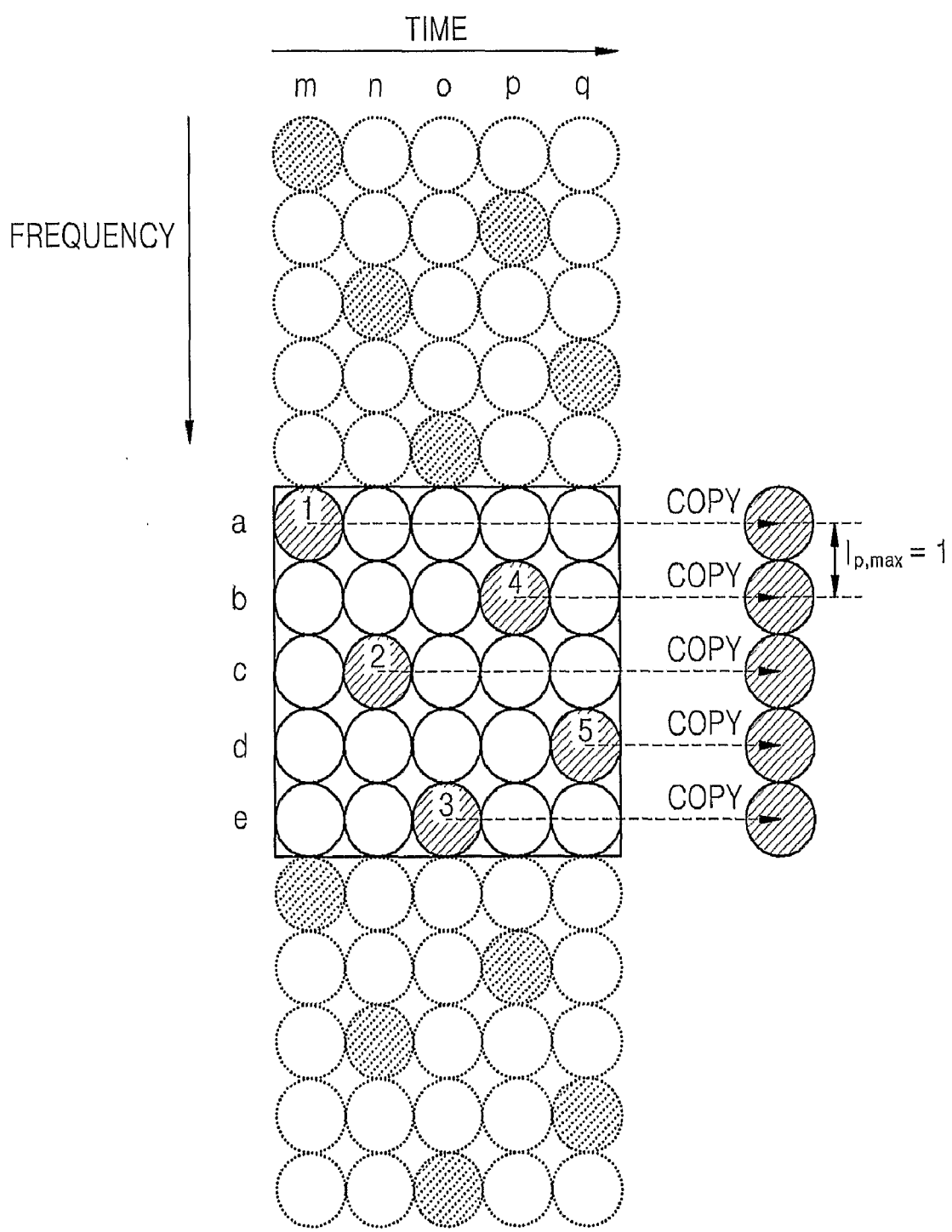

Referring to FIG. 4E, in the q-th OFDMA symbol, which is the fifth and last OFDMA symbol in the slot, the last pilot inserting position is the only remaining d-th subcarrier.

When it is assumed that the channel environment does not significantly change during a slot, the pilot symbols of previous OFDMA symbols can be used for the last OFDMA symbol. Therefore, channel information can be copied from the positions of all of the pilot subcarriers to be used for channel estimation, preventing performance degradation due to interpolation. Since the channel information can be copied from the positions of all the pilot subcarriers in the last OFDMA symbol, the largest pilot interval is always 1.

FIGS. 5A to 5D show examples of a pilot pattern for various slot lengths generated by applying the method in FIG. 3.

In each of FIGS. 5A to 5D, the numbers in each of the subcarrier sequentially show frequency-time distances from pilots of previous OFDMA symbols including a pilot of a first OFDMA symbol to each subcarrier of a current OFDMA symbol. The leftmost number is the frequency-time distance from the pilot of the first OFDMA symbol in the slot to the current subcarrier position, and the rightmost number is the frequency-time distance from the pilot of the preceding OFDMA symbol to the current subcarrier position.

Figure 5A:
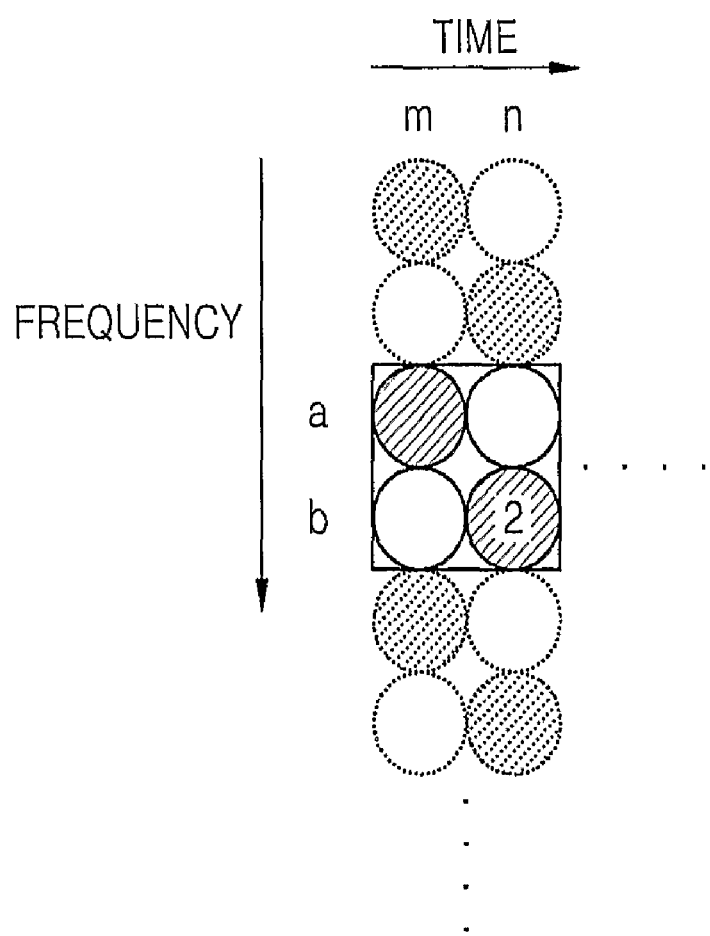

FIG. 5A shows a pilot pattern having a slot size of 2, with pilots inserted in zigzags. In this structure, the pilot density is very high, so this pattern is preferably used as a preamble structure of a frame rather than a repeated pilot pattern.

FIG. 5B shows a pilot pattern having a slot size of 7. When 4 OFDMA symbols are used for channel estimation, the pilot interval does not exceed 3, and when 7 OFDMA symbols are used, which is the same number as the slot size, the pilot interval can be 1, allowing stable channel estimation performance without an interpolation.

The pilot patterns shown in FIGS. 1 and 5B have the same pilot density. However, although in FIG. 1, two or more OFDMA symbols are used for channel estimation, the pilot interval cannot be decreased to less than 4. Therefore, channel estimation performance degradation in a bad channel environment cannot be avoided.

FIG. 5C shows a pilot pattern having a slot size of 8. In this case, when the number of OFDMA symbols used for channel estimation is 1, 2, 4, or 8, a regular interval pilot pattern can be obtained, allowing stable channel estimation performance without an interpolation.

Figure 5D:
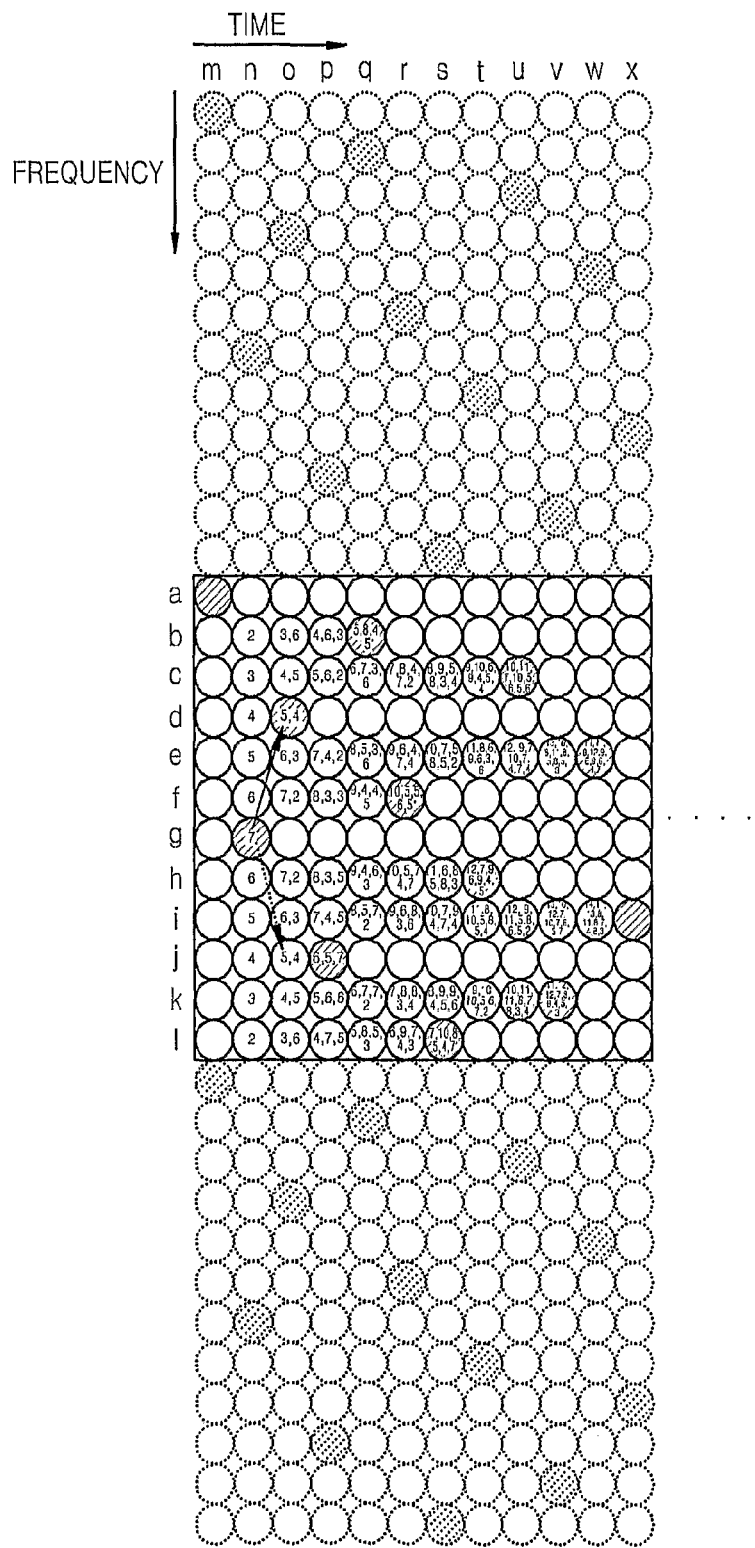

FIG. 5D shows a pilot pattern having a slot size of 12. When 4 OFDMA symbols are used, the pilot interval does not exceed 4, and when 12 OFDMA symbols are used, which is the same number as the slot size, the pilot interval can be 1, allowing stable channel estimation performance can be obtained without an interpolation.

Figure 2:
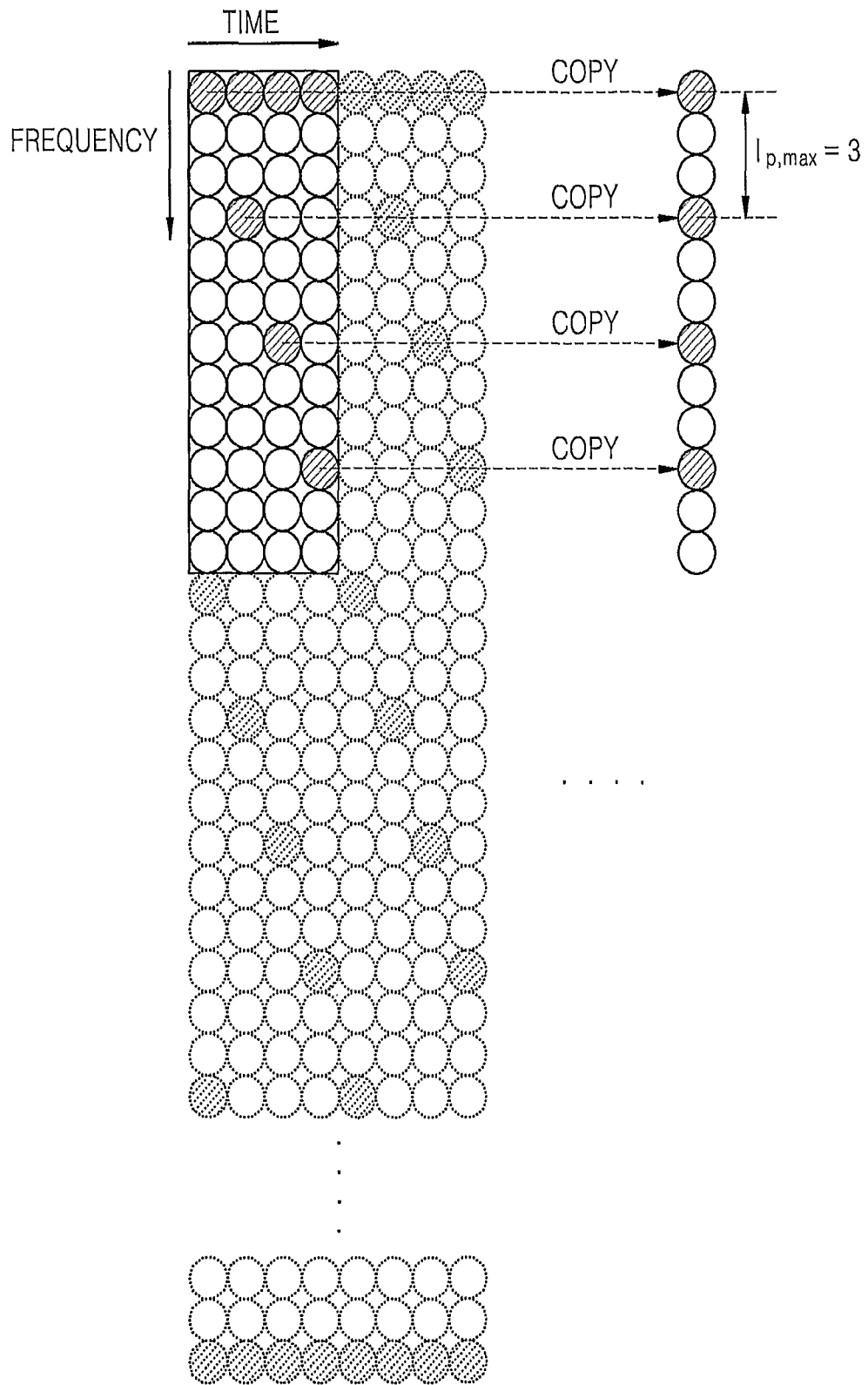
FIG. 2 shows a pilot pattern used in a European telecommunications standards institute (ETSI) digital video broadcasting terrestrial (handheld) (DVB-T (H)) mode.

The pilot patterns shown in FIGS. 2 and 5D have the same pilot density. However, although in FIG. 2, four or more OFDMA symbols are used for channel estimation, the pilot interval cannot be decreased to less than 3. Therefore, channel estimation performance degradation in a bad channel environment cannot be avoided.

Figure 6:
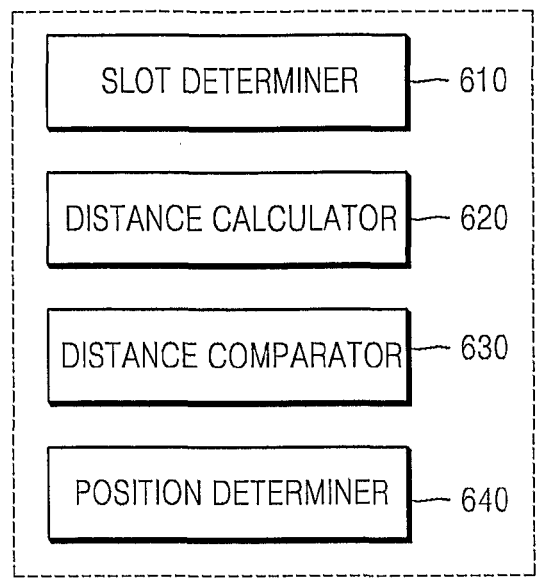
FIG. 6 is a block diagram of an apparatus for generating a pilot pattern according to an embodiment of the present invention.

FIG. 6 is a block diagram of an apparatus for generating a pilot pattern according to an embodiment of the present invention. Redundant description with the above description will be omitted in the following description.

Referring to FIG. 6, the apparatus for generating a pilot pattern includes a slot determiner 610, a distance calculator 620, a distance comparator 630, and a position determiner 640.

The slot determiner 610 determines the size of a slot, which is a section in which a pilot pattern is repeated in the frequency domain and the time domain. The size of the slot may be selected according to the channel characteristics of a target system.

The distance calculator 620 calculates frequency-time distances from pilots of previous OFDMA symbols to each of remaining subcarriers excluding subcarriers into which pilots in the previous OFDMA symbols of the slot are inserted, for each OFDMA symbol after the first OFDMA symbol of the slot. The frequency-time distance is the sum of the distances from the pilots of the previous OFDMA symbols to a subcarrier in the frequency axis and the time axis. When the distance comparator 630 compares values in the last minimum distance set of frequency-time distance sets, and the number of subcarriers having the same maximum minimum distance is two or more, the distance calculator 620 calculates frequency distances only in the frequency direction from the pilots of the previous OFDMA symbols to each of the two or more subcarriers.

The distance comparator 630 sequentially compares the minimum distances (ranging from the first minimum distance to the last minimum distance) in the frequency-time distance sets of each of remaining subcarriers, until a single subcarrier having the maximum frequency-time minimum distance is selected. For the distance comparison, the comparison of next frequency-time minimum distances is performed on subcarriers having the same largest value of current frequency-time minimum distances. When the number of subcarriers having the same maximum minimum distance is two or more, even though the last minimum distances of the frequency-time sets have been compared with each other, the distance comparator 630 compares frequency distances calculated by the distance calculator 620. The frequency distance comparison is sequentially performed on from the smallest distances of the frequency distance sets, and the comparison of the next frequency minimum distances is performed on subcarriers having the same largest value of current frequency minimum distances.

The position determiner 640 determines an arbitrary subcarrier position in a first OFDMA symbol within a slot as a pilot inserting position, and from the second OFDMA symbol, determines the subcarrier having the maximum frequency-time minimum distance as the pilot inserting position. When the number of subcarriers having the same maximum frequency-time minimum distance is two or more, even though the last minimum distances in the frequency-time distance sets have been compared with each other, the position determiner 640 determines the subcarrier having the maximum frequency distance as the pilot inserting position. Thereafter, when the number of subcarriers having the same maximum last frequency minimum distance is two or more, an arbitrary one of the two or more subcarriers is determined to be the pilot inserting position.

FIGS. 7 to 10 show examples of adaptively applying a pilot pattern designed according to an embodiment of the present invention, according to a channel environment between a base station and a terminal in an OFDMA system.

Factors to be considered when the pilot pattern in the OFDMA system is designed are mainly granularity, pilot density, transmission efficiency, channel estimation latency, memory size needed for channel estimation, and channel estimation performance. Granularity is a characteristic required to effectively support burst data having a small size used for voice over Internet protocol services or the like. Pilot density is a characteristic that the ratio of pilot subcarriers to data subcarriers must low to obtain high transmission efficiency. The channel estimation latency represents the number of OFDMA symbols which have to be received for collecting channel information from pilots needed for channel estimation while maintaining a low pilot density. As the channel estimation latency increases, the memory size for storing the past data needed for channel estimation also increases. The channel estimation performance becomes stable as channel information on pilots is used more. However, if the number of pilots is insufficient, interpolation has to be performed at a data subcarrier position between pilot subcarriers. These requirements cannot be simultaneously satisfied. However, by using tolerance of the channel estimation performance according to the channel environment, other types of performance can be adaptively improved.

Figure 7:
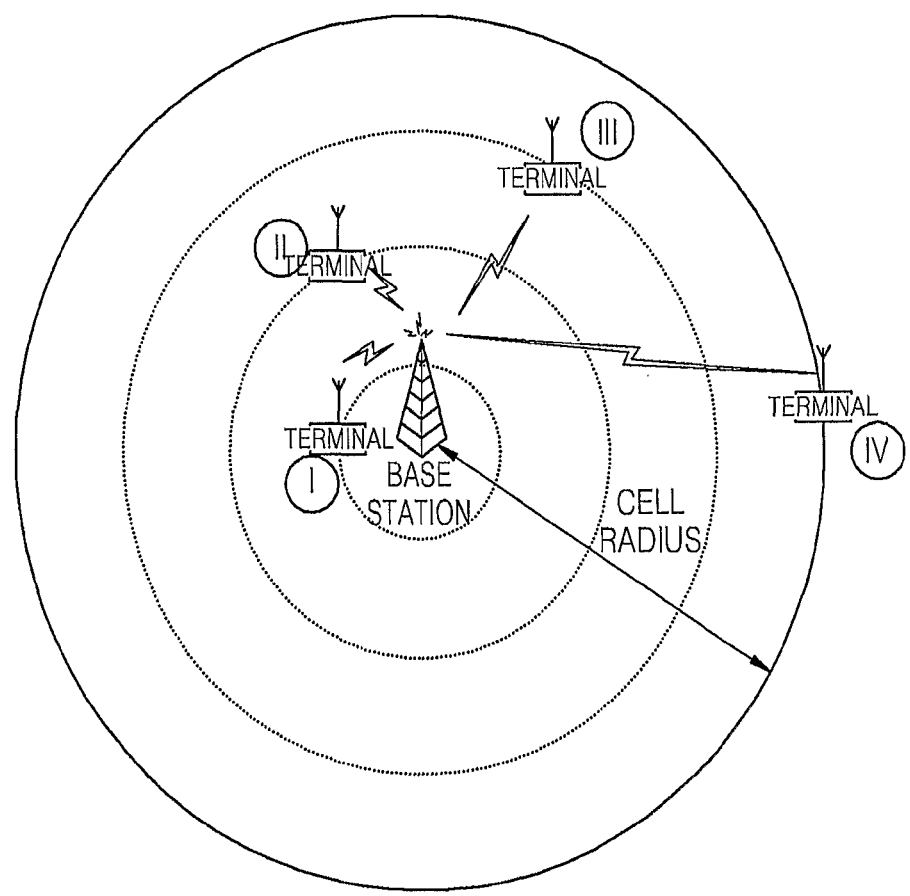
FIG. 7 is a diagram for explaining an example of a channel environment which becomes different according to terminal positions in a cell.

FIG. 7 is a diagram for explaining an example of a channel environment which changes according to terminal positions in a cell.

A type I terminal is located near a base station and therefore has a very good channel environment with high signal strength and frequent line-of-sight signals. A type II terminal is a little further than the type I terminal from the base station, and therefore has a relatively good channel environment, but suffers some multipath influence. A type III terminal is a little further than the type II terminal from the base station, and therefore has a bad channel environment and suffers from serious multipath influence. A type IV terminal is at the edge of the cell and therefore has a very bad channel environment with almost no line-of-sight signals, very low signal strength, and serious interference from adjacent cells and multipath influence.

The above examples describe four types of channel environment. However, it will be understood by those skilled in the art that the types may differ according to circumstance.

Figure 8:
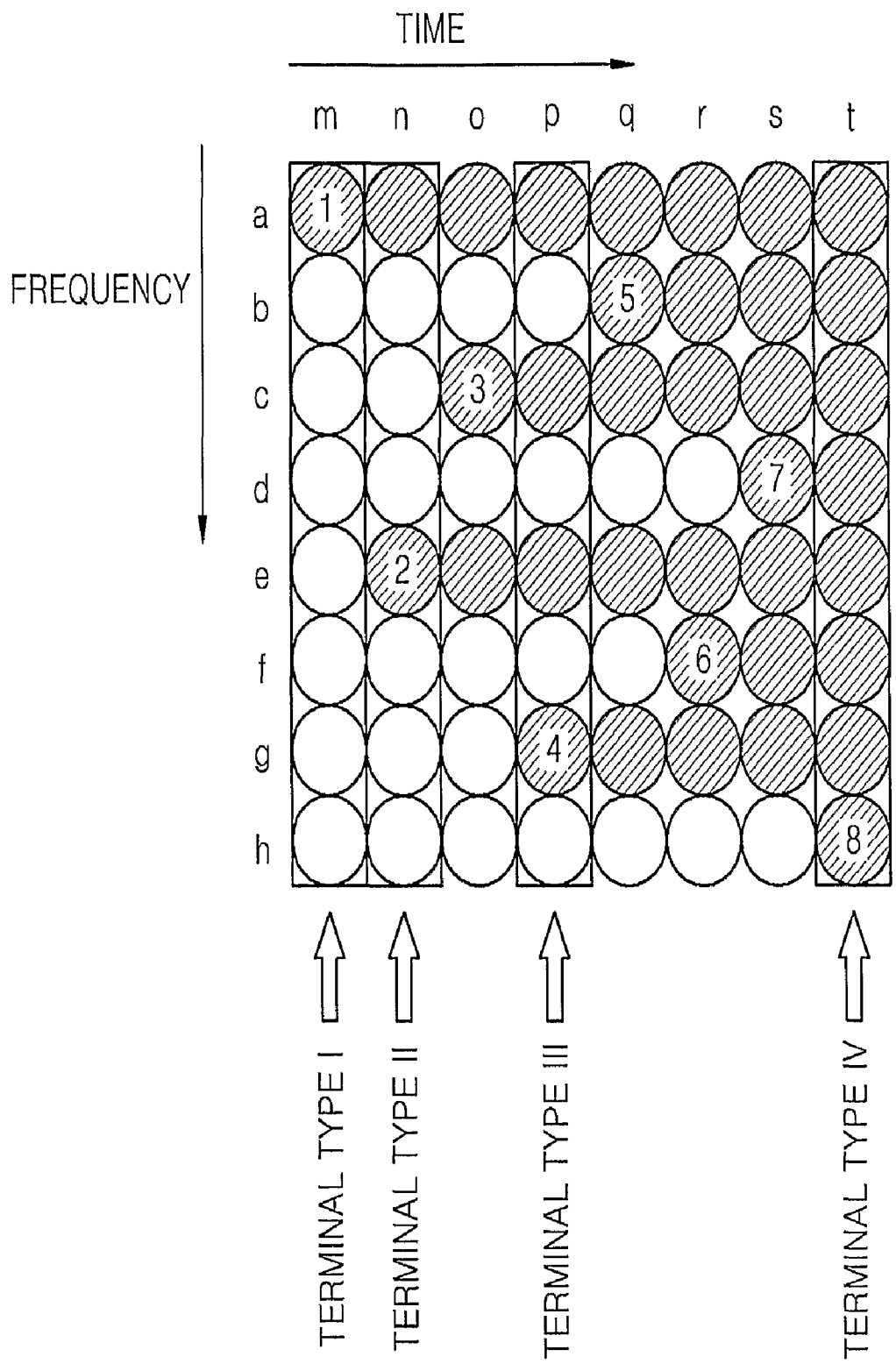
FIG. 8 is a diagram for explaining the number of OFDMA symbols which can be selected in the pilot pattern generated according to an embodiment of the present invention for adaptive channel estimation according to a channel estimation of each terminal shown in FIG. 7 using overlapped pilot structures.

FIG. 8 is a diagram for explaining the number of OFDMA symbols which can be selected from the pilot pattern generated according to an embodiment of the present invention for adaptive channel estimation according to a channel estimation of each terminal shown in FIG. 7, using overlapped pilot structure.

In the above example, the size of a slot includes 8 subcarriers in the frequency domain and 8 OFDMA symbols in the time domain, a numeral in a subcarrier in each OFDMA symbol represents the order of the subcarrier position determined to be a pilot inserting position in each OFDMA symbol.

Referring to FIG. 8, the pilot pattern according to the current embodiment can change the pilot symbol density (the frequency pilot interval used for channel estimation) according to the channel environment. When the channel environment is good, the minimum burst allocation unit (size) is small. Therefore channel estimation latency at the receiver decreases, and the frequency pilot interval used for channel estimation increases.

The type I terminal has a good channel environment, so the minimum burst allocation size is 1 OFDMA symbol, and therefore the frequency pilot interval for channel estimation becomes 8.

The type II terminal has a relatively good channel environment, so the minimum burst allocation size is 2 OFDMA symbols, and therefore the frequency pilot interval for channel estimation becomes 4.

The type III terminal has a bad channel environment, so the minimum burst allocation size is 4 OFDMA symbols, and therefore the frequency pilot interval for channel estimation becomes 2.

The type IV terminal has a very bad channel environment, so the minimum burst allocation size is 8 OFDMA symbols, and therefore the frequency pilot interval for channel estimation becomes 1.

The pilot structures according to the minimum burst allocation sizes allocated to the type I, II, III, and IV terminals may change according to pilot patterns and the channel environment of the terminal. However, since the channel estimation performance is determined by the pilot subcarrier interval, it is preferable that a structure having a regular pilot interval is selected. When the pilot interval is not regular, the maximum pilot interval becomes a critical factor in the channel estimation performance.

Figure 9:
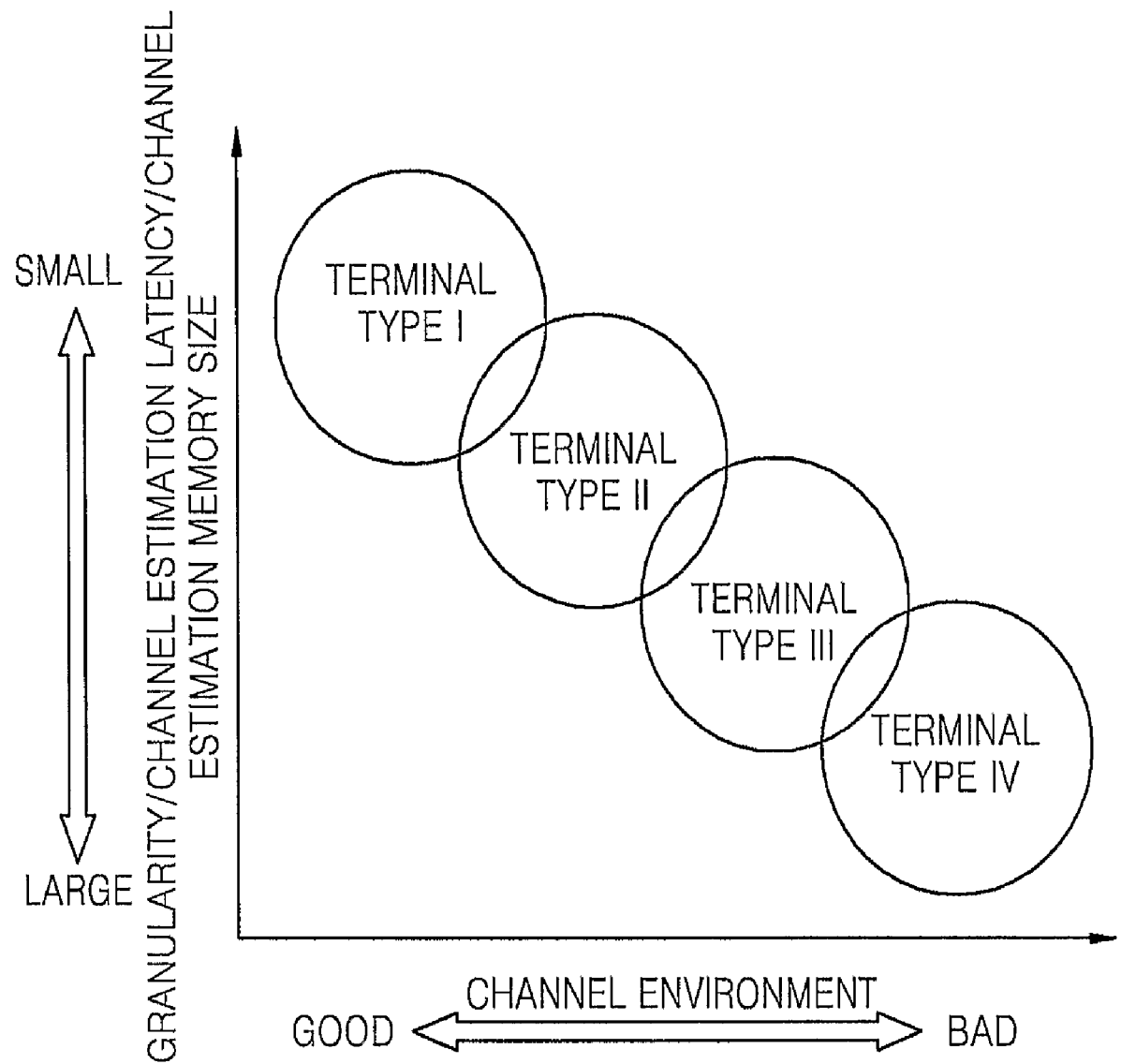
FIG. 9 shows the relationship between granularity, channel estimation latency, channel estimation memory size, and a transmission channel environment of a terminal shown in FIG. 7.

FIG. 9 shows the relationship between granularity, channel estimation latency, and channel estimation memory size according to a transmission channel environment of a terminal shown in FIG. 7.

Since the type I terminal has a very good channel environment, stable channel estimation performance can be obtained by using the pilot structure corresponding to the type I position shown in FIG. 8. Therefore, the type I terminal performs channel estimation using a single OFDMA symbol, so that the burst size to be allocated is small, channel estimation latency and memory size are small, and granularity is excellent.

Since the type II terminal has a relatively good channel environment, stable channel estimation performance can be obtained by using the pilot structure corresponding to the type II position shown in FIG. 8. Therefore, the type II terminal performs the channel estimation using two OFDMA symbols, giving still excellent granularity, low channel estimation latency, and low memory size.

Since the type III terminal has a relatively bad channel environment, stable channel estimation performance can be obtained by using the pilot structure corresponding to the type III position shown in FIG. 8. Therefore, the type III terminal performs the channel estimation using four OFDMA symbols, deteriorating granularity and increasing the channel estimation latency and memory size.

Since the type IV has a very bad channel environment, stable channel estimation performance has to be guaranteed by using the pilot structure corresponding to the type IV position shown in FIG. 8. Therefore, 8 OFDMA symbols in the slot are used to perform channel estimation, deteriorating granularity and increasing the channel estimation latency and memory size. However, channel information from pilot subcarriers of other OFDMA symbols can be copied to be used for all subcarriers in the last OFDMA symbol of the slot, preventing channel estimation performance degradation due to interpolation. Assuming that the channel does not significantly change in the time domain during a slot, the pilot channel information on previous OFDMA symbols in the slot can be copied to the last OFDMA symbol in the slot.

Figure 10:
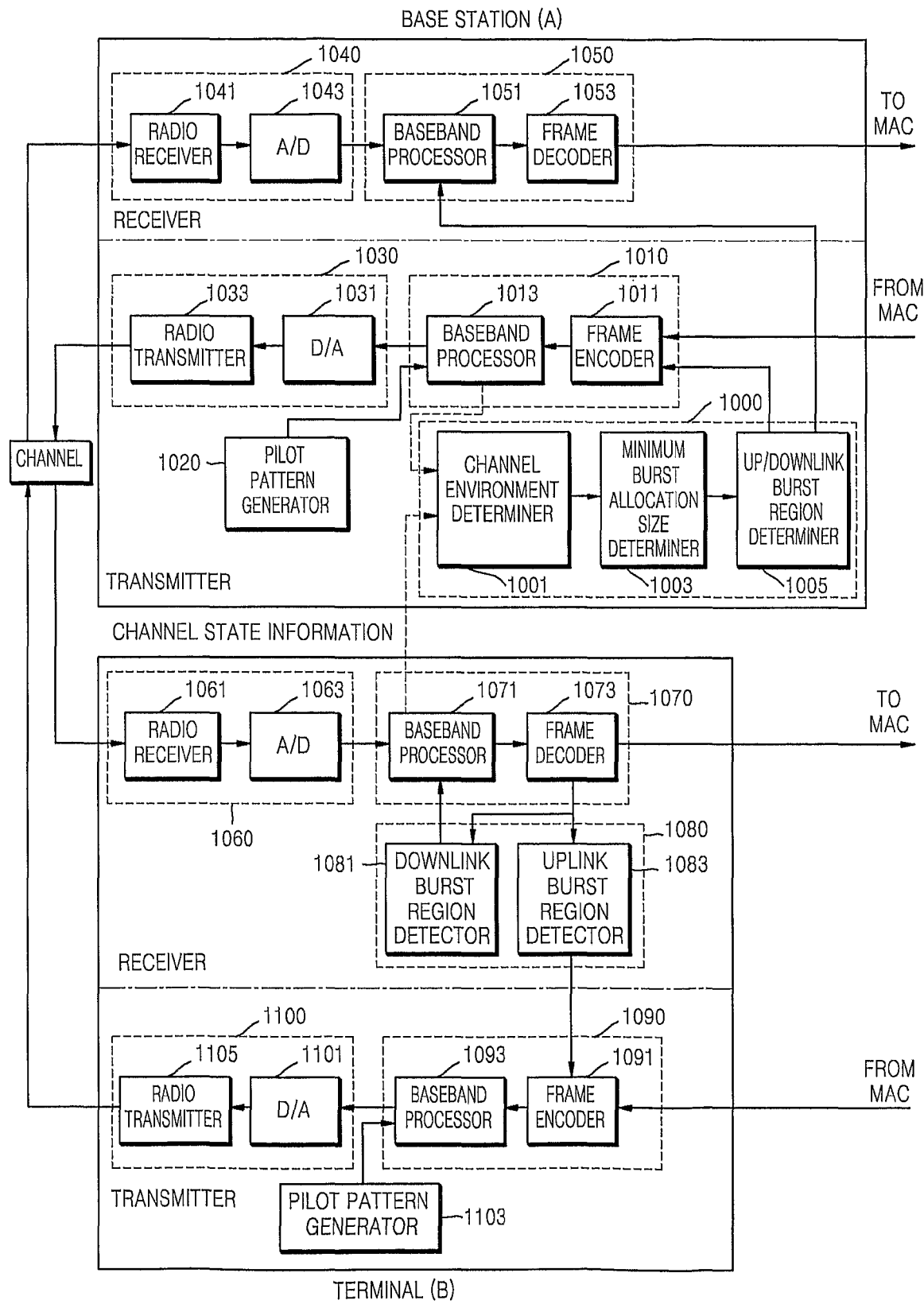
FIG. 10 is a block diagram showing a signal processing flow between a base station A which selects an adaptive pilot pattern by using channel state information and a user terminal B according to an embodiment of the present invention.

FIG. 10 is a block diagram showing a signal processing flow between a base station A which selects an adaptive pilot pattern by using channel state information and a user terminal B according to an embodiment of the present invention.

The pilot pattern generated according to the current embodiment of the present invention can adaptively select a pilot structure that can be used for channel estimation according to the channel environment between the base station and the terminal, allowing efficient application of resources.

FIG. 10 shows i) a flow in which a base station A determines a minimum burst allocation unit (size) of a user terminal B using feedback channel state information received from the user terminal B or channel state determination criterion algorithm set of the base station A itself in advance, and transmits a signal to the user terminal B, and the user terminal B detects the minimum burst allocation size in the signal received from the base station A and performs channel estimation, and ii) a flow in which the user terminal B transmits a signal to the base station A based on the detected minimum burst allocation size, and the base station A processes the signal received from the user terminal B based on the minimum burst allocation size allocated to the user terminal B in advance and performs channel estimation.

Referring to FIG. 10, the base station A includes a transmitter and a receiver. The transmitter includes a burst region determiner 1000, a transmission signal generator 1010, a pilot pattern generator 1020, and a signal transmitter 1030. The receiver includes a signal receiver 1040 and a received signal processor 1050. The user terminal B includes a transmitter and a receiver. The transmitter includes a transmission signal generator 1090, a pilot pattern generator 1103, and a signal transmitter 1100. The receiver includes a signal receiver 1060, a received signal processor 1070, and a burst region detector 1080.

In the transmitter of the base station A, the burst determiner 1000 determines the minimum burst allocation size of the terminal based on a determination criterion set in advance. The determination criterion may be the channel state information received from the terminal or a channel state determination criterion algorithm set in the base station itself in advance. The burst determiner 1000 determines the minimum burst allocation size to be small as the channel state allows. The burst determiner 1000 includes a channel environment determiner 1001 for determining the channel environment based on the determination criterion, a minimum burst allocation size determiner 1003 for determining the minimum burst allocation size of the terminal based on the channel environment, and an up/downlink burst region determiner 1005 for determining an up and down link burst region including information on the minimum burst allocation size. The channel environment may be set to include position information on the terminal with respect to the base station. The minimum burst allocation size of the terminal is from a 1 OFDMA symbol to the number of OFDMA symbols of a slot, a slot size in the time domain.

In the transmission signal generator 1010, a frame encoder 1011 encodes the information on the up/downlink burst region determined by the burst determiner 1000, into a frame header. A baseband processor 1013 includes such as a serial to parallel converter, an inverse fast Fourier transformer, a cyclic prefix (CP) inserting unit, and a parallel to serial converter, and inserts a data symbol and a pilot symbol into a signal output from the frame encoder 1011 according to a control signal of the pilot pattern generator 1020, to perform OFDMA modulation.

In the signal transmitter 1030, a digital to analog (D/A) converter 1031 converts a digital signal output from the transmission signal generator 1010 into an analog signal, and a wireless transmitter (also referred to as radio frequency (RF) front-end) 1033 up-converts the analog signal into an RF signal and transmits the RF signal.

The pilot pattern generator 1020 generates a pilot pattern in which a pilot interval used for channel estimation can be changed according to the minimum burst allocation size, and generates a signal for controlling the position of a pilot to be inserted according to the pilot pattern. The pilot pattern is generated according to the embodiments of the present invention, by determining pilot positions in each OFDMA symbol within a slot which is a section in which pilots are repeated in the time domain and the frequency domain, based on distances in the frequency and time direction, from pilot positions in the previous OFDMA symbols within the slot to a subcarrier in a current OFDMA symbol excluding rows of subcarriers into which the pilots of the previous OFDMA symbols are inserted. The pilot pattern generated by the pilot pattern generator 1020 may be as described above with reference to FIGS. 3 to 5, so their detailed description will be omitted.

In the receiver of the base station A, the signal receiver 1040 receives a signal from the user terminal B, a radio receiver 1041 down-converts an RF signal into an intermediate frequency (IF) signal, and an analog to digital (A/D) converter 1043 converts an analog signal into a digital signal. In the received signal processor 1050, a baseband processor 1051 demodulates the converted digital signal based on an uplink burst region determined by the burst determiner 1000, and a frame decoder 1053 recovers the received signal by performing frame decoding. The baseband processor 1051 includes such as a serial to parallel converter, a fast Fourier transformer, and a parallel to serial converter, and demodulates data received after channel estimation latency according to the uplink minimum burst size, and estimates a channel.

In the receiver of the user terminal B, the signal receiver 1060 receives a signal from the base station A through a wireless channel. In the signal receiver 1060, a radio receiver (also referred to as an RF front-end) 1061 down-converts the RF signal into the IF signal, and an A/D converter 1063 converts the analog signal into the digital signal. The signal received from the base station A is a signal transmitted according to a pilot pattern in which pilot intervals used for the channel estimation can be changed. The pilot pattern is generated according to the embodiments of the present invention, by determining pilot positions in each OFDMA symbol of a slot which is a section in which pilots are repeated in the time domain and the frequency domain, based on distances in the frequency and time direction, from pilot positions in the previous OFDMA symbols within the slot to a subcarrier in a current OFDMA symbol excluding rows of subcarriers into which the pilots in the previous OFDMA symbols are inserted.

In the received signal processor 1070, a baseband processor 1071 demodulates the received signal, and a frame decoder 1073 recovers the received signal by performing frame decoding. A baseband processor 1071 includes such as a serial to parallel converter, a fast Fourier transformer, and a parallel to serial converter, and demodulates data received after channel estimation latency according to a downlink minimum burst size detected by a burst region detector 1080 which will be described later, and estimates a channel.

In the burst region detector 1080, a downlink burst region detector 1081 detects the downlink burst region based on the information recovered from the frame header of the received signal, and an uplink burst region detector 1083 detects an uplink burst region.

The transmitter of the user terminal B transmits data to the base station A according to the minimum burst allocation size corresponding to detected information on the uplink burst region. In the transmission signal generator 1090, a frame encoder 1091 encodes detected uplink burst region information including the minimum burst allocation size into a frame header, and a baseband processor 1093 inserts pilots according to a control signal of the pilot pattern generator 1103. The baseband processor 1093 generates a pilot pattern in which pilot intervals for channel estimation can be changed, in order to generate a transmission signal, and includes a serial to parallel converter, an inverse fast Fourier transformer, a cyclic prefix (CP) inserting unit, and a parallel to serial converter to perform OFDMA modulation on data to be transmitted. In the signal transmitter 1100, a D/A converter 1101 converts a digital signal output from the transmission signal generator 1090 into an analog signal, and a radio transmitter (also referred to as an RF front-end) 1105 up-converts the analog signal into an RF signal and transmits the RF signal.

Figure 11A:
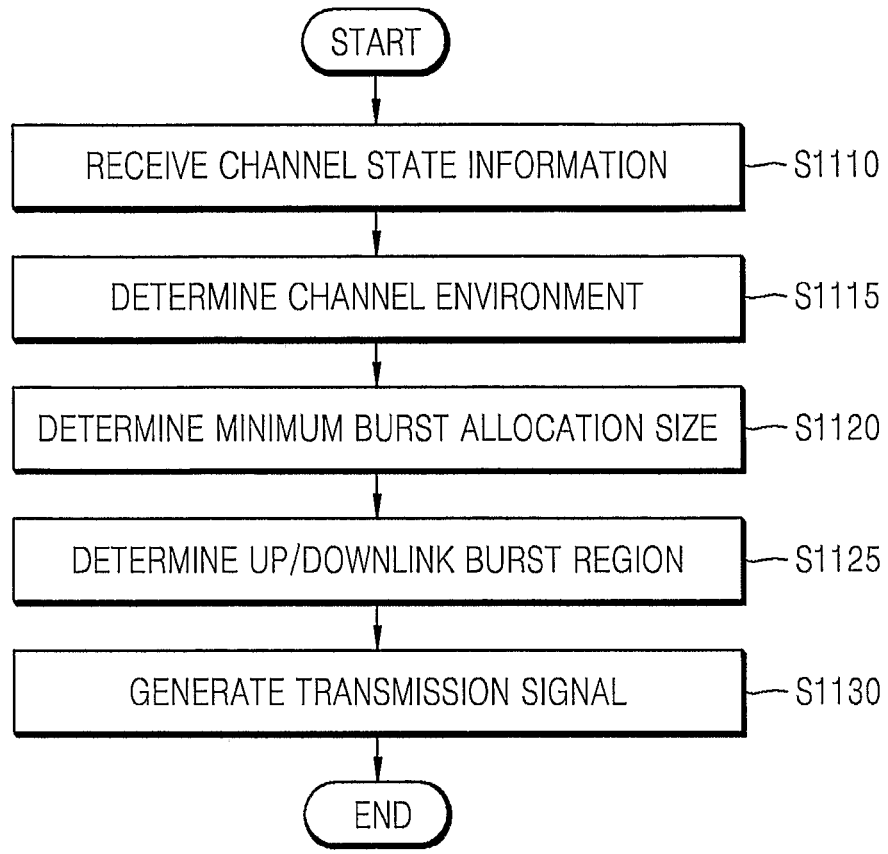
FIGS. 11A and 11B are flowcharts for explaining a method of transmitting and receiving data for a base station by determining a minimum burst allocation size according to an embodiment of the present invention.
Figure 11B:
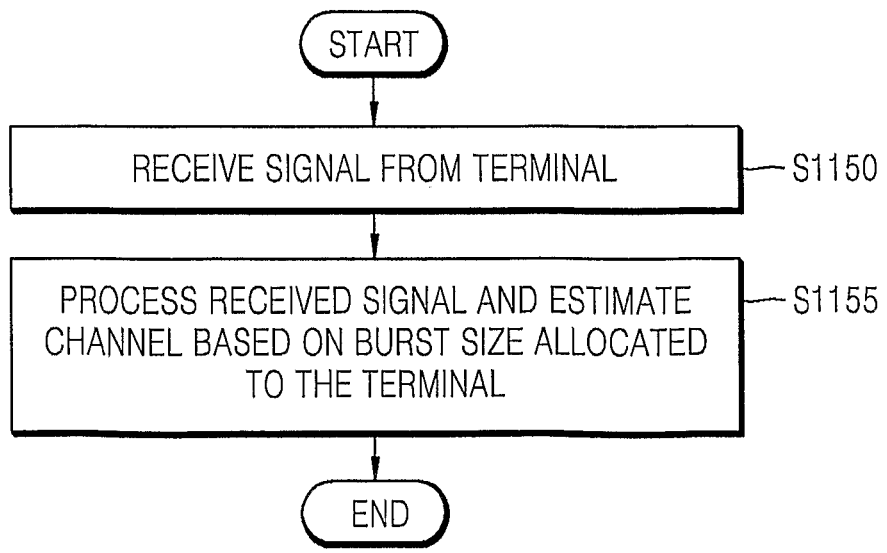
Figure 12A:
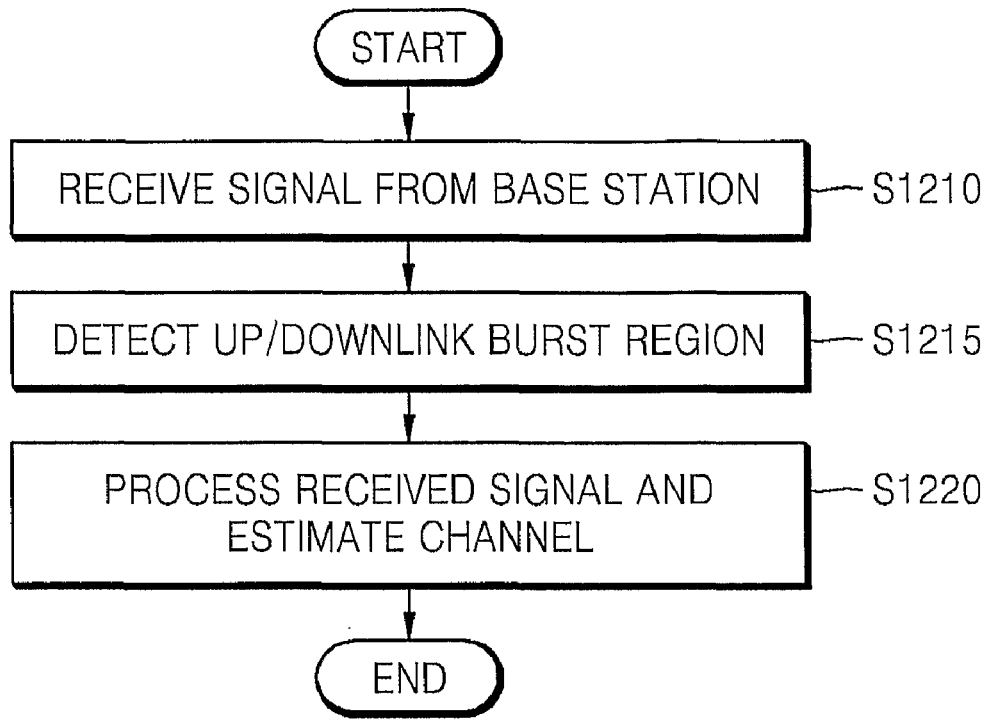
FIGS. 12A and 12B are flowcharts for explaining a method of transmitting and receiving data for a terminal according to an embodiment of the present invention.
Figure 12B:
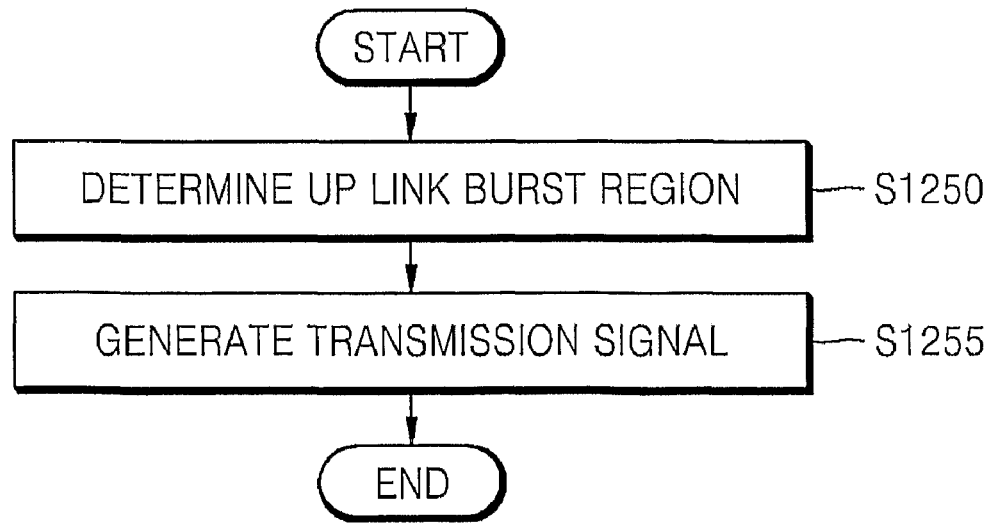

FIGS. 11A and 11B are flowcharts for explaining a method of transmitting and receiving data from a viewpoint of a base station according to the embodiment shown in FIG. 10, and FIGS. 12A and 12B are flowcharts for explaining a method of transmitting and receiving data from a viewpoint of a user terminal. Redundant description with the above description will be omitted in the following description.

Referring to FIG. 11A, the base station determines the minimum burst allocation size of the terminal based on a determination criterion set in advance. For example, the base station may determine the minimum burst allocation size based on channel state information received from the terminal (operation S1110) or the channel state determination criterion algorithm set of the base station itself in advance.

The base station determines a channel environment based on the received channel state information (operation S115), determines the minimum burst allocation size of the terminal based on the channel environment (operation S1120), and determines an up/downlink burst region including the minimum burst allocation size information (operation S1125). The channel environment can be set using parameters such as the distance of the terminal from the base station. When the channel environment between the terminal and the base station is good, the minimum burst allocation size is small. The minimum burst allocation size of the time domain is in the range between 1 OFDMA symbol and a slot size in the time domain. As the minimum burst allocation size decreases, a frequency pilot interval for channel estimation increases.

Next, a transmission signal is generated based on the pilot pattern generated according to the current embodiment of the present invention, and transmitted to the terminal (operation S1130).

Referring to FIG. 12A, the terminal receives the signal transmitted according to the pilot pattern from the base station (operation S1210).

The terminal detects the up/downlink burst region from a frame header of the received signal (operation S1215).

A channel for the received signal is estimated based on the detected downlink burst region after channel estimation latency (operation S1220).

Referring to FIG. 12B, the terminal checks and uses an uplink burst region of data to be transmitted based on the detected uplink burst region information (operation S1250), and generates a pilot pattern in which pilot intervals for channel estimation can be changed.

A transmission signal is generated in the determined uplink burst region based on the pilot pattern (operation S1255).

Referring to FIG. 11B, the base station receives the signal from the terminal (operation S1150).

The base station estimates a channel based on the uplink burst region determined according to the channel environment when transmitting a signal to the terminal after channel estimation latency in response to the received signal (operation S155).

In the pilot pattern in which pilot intervals for channel estimation can be changed, each OFDMA symbol brings pilot information on the previous OFDMA symbols, so that all subcarriers in the last OFDMA symbol in a slot can use pilot information without interpolation. Therefore, the pilot interval can be determined according to the positions of OFDMA symbols in the slot. Accordingly, a proper pilot structure can be selected according to the channel environment. Detailed description is provided with reference to FIGS. 3 to 9.

For convenience of description, an OFDMA system has been used as an example. However, it will be understood by those skilled in the art that the present invention can also be applied to an OFDM system.

This application claims the benefit of U.S. Patent Application No. 10-2007-0040013, filed on Apr. 24, 2007 in the Korean Intellectual Property Office, and the benefit of U.S. Provisional Patent Application No. 60/794,328, filed on Apr. 24, 2006, and U.S. Patent No. 60/845,571, filed on Sep. 19, 2006, the disclosures of which are incorporated herein in their entirety by reference.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and detail may be made therein without departing from the spirit and scope of the invention as defined by the appended claims. The exemplary embodiments should be considered in a descriptive sense only, and not for purposes of limitation. Therefore, the scope of the invention is defined not by the detailed description of the invention but by the appended claims, and all differences within the scope will be construed as being included in the present invention.

The invention claimed is:

1. A method of generating a pilot pattern, comprising:
   (a) determining a size of a slot which is a section in which the pilot pattern is repeated in a time domain and a frequency domain;
   (b) determining an arbitrary subcarrier from a plurality of subcarriers in a first OFDMA (orthogonal frequency division multiple access) symbol within the slot in the time domain as a pilot inserting position;
   (c) calculating frequency-time distances of each of remaining subcarriers of a current OFDMA symbol after the first OFDMA symbol, which excludes the arbitrary subcarrier and subcarriers having an inserted pilot in each of a previous OFDMA symbol within the slot in the time domain, from the inserted pilot in the first OFDMA symbol and each of the previous OFDMA symbol within the slot in the time domain to each of the remaining subcarriers;
   (d) comparing minimum distances of a frequency-time distance sets of each of the remaining subcarriers; and
   (e) determining a subcarrier from the remaining subcarriers having a largest frequency-time minimum distance from the compared minimum distances,
   wherein the determined subcarrier is to be a next pilot inserting position of the current OFMDA symbol.

2. The method of claim 1, wherein (d) is repeatedly performed on first minimum distances to last minimum distances of the frequency-time distance sets, until a number of the remaining subcarriers having the largest frequency-time minimum distance is one, and
   wherein next frequency-time minimum distances of each of the remaining subcarriers having a same largest value of current frequency-time minimum distances are compared.

3. The method of claim 2, wherein the first minimum distance is a smallest value in the frequency-time distance sets, and the last minimum distance is a largest value in the frequency-time distance sets.

4. The method of claim 2, further comprising:
   (f) when the number of the remaining subcarriers having a same largest value is two or more after comparing the last minimum distances in the frequency-time distance sets, calculating frequency distances of each of the remaining subcarriers having the same largest value from the inserted pilot of the arbitrary subcarrier and each of the previous OFDMA symbols within the slot in the time domain to each of the remaining subcarriers having the same largest value, which is only done in a frequency direction;
   (g) comparing minimum distances in a frequency distance sets; and
   (h) determining a subcarrier from the two or more largest value subcarriers having a largest frequency minimum distance, which is done after comparing the last minimum distances in the frequency-time distances set,
   wherein the determined subcarrier is to be the next pilot inserting position of the current OFMDA symbol.

5. The method of claim 4,
   wherein (g) is repeatedly performed on first minimum distances to last minimum distances of the frequency distance sets, until a number of the remaining subcarriers having the largest frequency minimum distance is one, and
   wherein next frequency minimum distances of each of the remaining subcarriers having a same largest value of current frequency minimum distances are compared.

6. The method of claim 5, wherein the first minimum distance in the frequency distance sets is a smallest value in the frequency distance sets, and the last minimum distance in the frequency distance sets is a maximum value in the frequency distance sets.

7. The method of claim 5, further comprising:
   (i) when the number of remaining subcarriers having a same largest value is two or more after comparing the last minimum distances in the frequency distance sets, determining an arbitrary one of the remaining subcarriers having the same largest value of the last minimum distances in the frequency distance sets to be the next pilot inserting position of the current OFMDA symbol.

8. The method of claim 1, wherein the frequency-time distance of each of the remaining subcarriers is a sum of distances from the inserted pilot of the arbitrary subcarrier and each of the previous OFDMA symbols to each of the remaining subcarriers in a frequency direction and a time direction.

9. The method of claim 1, wherein (c) to (e) are repeatedly performed till a last OFDMA symbol within the slot in the time domain.

10. An apparatus for generating a pilot pattern, comprising:
    a slot determiner determining a size of a slot which is a section in which the pilot pattern is repeated in a time domain and a frequency domain;
    a distance calculator calculating frequency-time distances of each of remaining subcarriers of a current OFDMA symbol after a first OFDMA symbol, which excludes an arbitrary subcarrier having an inserted pilot in the first OFDMA symbol and subcarriers having an inserted pilot in each of a previous OFDMA symbol within the slot in the time domain, from the inserted pilot of the first OFDMA symbol and each of the previous OFDMA symbols within the slot in the time domain to each of the remaining subcarriers;
    a distance comparator comparing a minimum distance of a frequency-time distance sets of each of the remaining subcarriers; and
    a position determiner determining a subcarrier from the remaining subcarriers having a maximum frequency-time minimum distance from the compared minimum distances,
    wherein the determined subcarrier is to be a next pilot inserting position of the current OFMDA symbol, and
    where in the position determiner determining the arbitrary subcarrier in the first OFDMA symbol within the slot in the time domain as a pilot inserting position for the inserted pilot in the first OFDMA symbol.

11. The apparatus of claim 10,
    wherein the distance comparator performs comparison on first minimum distances to last minimum distances of the frequency-time distance sets, until a number of the remaining subcarriers having a largest frequency-time minimum distance is one, and
    wherein the distance comparator compares a next frequency-time minimum distances of each of the remaining subcarriers having a same largest value of current frequency-time minimum distances.

12. The apparatus of claim 11, wherein the first minimum distance is a smallest value in the frequency-time distance sets, and the last minimum distance is a largest value in the frequency-time distance sets.

13. The apparatus of claim 12,
wherein the distance calculator calculates frequency distances of each of the remaining subcarriers having the same largest value, from the inserted pilot of the arbitrary subcarrier in the first OFDMA symbol and each of the previous OFDMA symbols within the slot in the time domain to each of the remaining subcarriers having the same largest value, which is done in a frequency direction, when the number of the remaining subcarriers having a same largest value is two or more after comparing the last minimum distances in the frequency-time distance sets,
wherein the distance comparator compares the minimum distances in a frequency distance sets, and
wherein the position determiner determines a subcarrier from the remaining subcarriers having a largest frequency minimum distance to be the next pilot inserting position of the current OFMDA symbol.

14. The apparatus of claim 13,
wherein the distance comparator performs comparison on first minimum distances to last minimum distances of the frequency distance sets, until a number of the remaining subcarriers having the largest frequency minimum distance is one, and
wherein a next frequency minimum distance of each of the remaining subcarriers having a same largest value of current frequency minimum distances are compared.

15. The apparatus of claim 14, wherein the first minimum distance in the frequency distance sets is a smallest value in the frequency distance sets, and the last minimum distance in the frequency distance sets is a largest value in the frequency distance sets.

16. The apparatus of claim 14, wherein the position determiner determines one of the remaining subcarriers having the same largest value of the last minimum distances in the frequency distance sets to be the next pilot inserting position of the current OFMDA symbol, when the number of remaining subcarriers having the same largest value is two or more after comparing the last minimum distances in the frequency distance sets.

17. The apparatus of claim 10, wherein the frequency-time distance of each of the remaining subcarriers is a sum of distances from the inserted pilot of the arbitrary subcarrier in the first OFDMA symbol and each of the previous OFDMA symbols to each of the remaining subcarriers in a frequency direction and a time direction.

18. The apparatus of claim 10, wherein the distance comparison and the position determination are repeatedly performed till a last OFDMA symbol within the slot in the time domain.

* * * * *